US009665303B1

(12) United States Patent
Huff et al.

(10) Patent No.: US 9,665,303 B1
(45) Date of Patent: *May 30, 2017

(54) METHOD AND APPARATUS FOR STORING INFORMATION USING AN INTELLIGENT BLOCK STORAGE CONTROLLER

(71) Applicant: Divergent Storage Systems, Inc., The Woodlands, TX (US)

(72) Inventors: Greg Huff, The Woodlands, TX (US); John Hemphill, Spring, TX (US)

(73) Assignee: DIVERGENT STORAGE SYSTEMS, INC., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,001

(22) Filed: Oct. 12, 2016

(51) Int. Cl.
*G06F 3/06* (2006.01)
*G06F 12/1009* (2016.01)
*G06F 11/10* (2006.01)

(52) U.S. Cl.
CPC ............ *G06F 3/064* (2013.01); *G06F 3/065* (2013.01); *G06F 3/0619* (2013.01); *G06F 3/0661* (2013.01); *G06F 3/0664* (2013.01); *G06F 3/0665* (2013.01); *G06F 3/0685* (2013.01); *G06F 11/1044* (2013.01); *G06F 11/1076* (2013.01); *G06F 12/1009* (2013.01); *G06F 2212/657* (2013.01)

(58) Field of Classification Search
CPC ............................... G06F 3/064; G06F 3/0619
See application file for complete search history.

(56) References Cited

U.S. PATENT DOCUMENTS

| 5,335,352 | A | 8/1994 | Yanai et al. |
|---|---|---|---|
| 6,880,052 | B2 | 4/2005 | Lubbers et al. |
| 8,832,234 | B1 | 9/2014 | Brooker et al. |
| 8,918,392 | B1 | 12/2014 | Brooker et al. |
| 9,021,141 | B2 | 4/2015 | El-Batal et al. |
| 9,542,272 | B2* | 1/2017 | Krishnamurthy ... G06F 11/1092 |
| 2003/0066010 | A1* | 4/2003 | Acton .................... G11B 20/18 714/758 |
| 2004/0054858 | A1* | 3/2004 | Chandrasekaran ... G06F 3/0608 711/154 |
| 2008/0243769 | A1* | 10/2008 | Arbour ............... G06F 11/1453 |
| 2011/0178988 | A1* | 7/2011 | Satoyama ............ G06F 3/0608 707/649 |
| 2011/0307659 | A1* | 12/2011 | Hans ..................... G06F 3/0613 711/114 |

(Continued)

OTHER PUBLICATIONS

Co-pending U.S. Appl. No. 15/291,987, filed Oct. 12, 2016.
U.S. Appl. No. 15/291,987 Office Action dated Mar. 15, 2017.

*Primary Examiner* — Matt Kim
*Assistant Examiner* — Katherine Lin
(74) *Attorney, Agent, or Firm* — Wilson Sonsini Goodrich & Rosati

(57) ABSTRACT

Methods, devices, and media for improving data storage reliability and efficiency comprising: creating at least one logical storage drive comprising a plurality of logical blocks; mapping the at least one logical storage drive to at least one physical storage drive based on many-to-one mapping or one-to-many mapping, wherein the at least one physical storage drive comprises a plurality of physical blocks; and applying a compression algorithm to data held in one or more logical blocks, aggregating units of the data, and storing the units of the data into one or more physical blocks.

11 Claims, 14 Drawing Sheets

(56) References Cited

U.S. PATENT DOCUMENTS

2014/0351526 A1   11/2014  Peterson
2016/0162209 A1    6/2016  Calderone et al.
2017/0024295 A1*  1/2017  Klughart ............. G06F 13/4247

* cited by examiner

METHOD AND APPARATUS FOR STORING INFORMATION USING AN INTELLIGENT BLOCK STORAGE CONTROLLER

BACKGROUND

Due in large part to low data storage cost and ubiquitous communication technologies, the demand for data storage is growing exponentially. Further, users of computing devices collect multimedia data much more often nowadays, so this demand is compounding. As such, efficient processing of data storage is advantageous.

SUMMARY OF THE TECHNOLOGIES

A physical storage drive is a complex piece of engineering, which includes multiple semiconductor devices, grained magnetic media platters, high speed read/write heads, spindle and servomotors, and a large firmware stack. When a drive has a defect, the entire drive is often treated as inoperable. However, the defect may be merely a firmware defect or a small problem in one sub-structure of the drive (e.g., a single read/write head, a portion of a platter surface, etc.); other sub-structures of the drive can still be utilized for data storage if a controller is enabled to circumvent these defects. To increase capacities of physical storage drives and minimize impact of minor defects, an intelligent data storage controller is disclosed.

A storage drive contains media, an interface, and a controller. Media comprises one or more platters, discs, silicon die, tapes, or other physical elements with physical properties (magnetic fields, optical properties, stored charge, resistance, etc.) that are used to encode data bits. Interfaces include direct connect options like Serial Attached SCSI (SAS), Serial AT Attachment (SATA), USB, FireWire, thunderbolt, as well as fabric options like iSCSI, Fibre Channel, and InfiniBand. The storage drive's controller organizes and manages the bits encoded on the media and makes them available over the interface abstracted as addressable fixed sized blocks.

Blocks are used by software such as an operating system, filesystem, hypervisor, application, or firmware in a tiered storage controller to create higher-level storage elements such as file systems, object stores, key value stores, etc.

The evolution of storage media has created many challenges. Hard drives now use Shingled Magnetic Recording (SMR) to increase density and thus capacity, but have been forced to trade off the performance of certain important write operations. Solid state drives desire to reduce their feature sizes to increase data density within a given die size. However, reducing the feature size decreases the number of lifetime program/erase cycles and thus the useful life of the media. An intelligent controller of data storage is disclosed to actively manage the storage drives to increase their lifetime and eliminate write performance trade-offs.

Storage processing can map the fixed length blocks from one or more storage drives to a computing system as logical blocks. Block level mapping solutions generally use linear maps or mapping tables. With these schemes, one logical block maps to one physical block within the storage drives. In some cases, mapping has duplicate copies of the map to different storage drives, also known as mirroring. In some embodiments, linear maps and mapping tables do not allow many logical blocks to map to one physical block or for one logical block to map to and span multiple physical blocks.

In some embodiments, linear mapping solutions do not allow remapping a logical block from one physical block to a different physical block. Mapping tables allow this capability, but usually in a coarse grained way that requires a large address range of logical blocks to be remapped together.

One-to-one mapping solutions do not allow the mapping of more logical blocks than available physical blocks within storage drives.

Thin provisioning allows the mapping of more logical blocks than physical blocks within storage drives. However, the number of physical blocks used will be converged to the mapped logical block count over time as the computing system uses the mapped capacity until it is filled.

De-duplication can allow the mapping of more logical blocks than physical blocks within storage drives if some of the logical blocks are identical, but does not allow this mapping if every block is unique.

In some embodiments, compression is used in higher-level storage elements such as files within a filesystem. In some embodiments, compression also exists on a limited scale within some storage drives and is used to organize and manage the media contained within a single storage drive into blocks. In some embodiments, compression is not used at the block level due the challenges of mapping the variable sized outcomes of compression into the fixed size blocks of storage drives.

In some embodiments, computing systems and tiered storage controllers view a storage drive as a monolithic device which must be either fully functional or is deemed completely non-functional. Small fractional failures within a storage drive cause the computing system or controller to stop using the entire storage drive. The failed storage drive is then physically removed and replaced with a new storage drive, which may take days or weeks to occur.

Inability to repair a storage drive on a partial failure casts burdens of preparing spare parts on the user and manufacturer.

Storage drives which have either failed or are being decommissioned likely contain private data that would constitute a data security breach if discarded. Users have to spend great efforts and expenses to prevent a security breach by physically destructing the storage drives. However, physical destruction is not always readily available to general users.

A storage drive, which is being used by computing system or a controller, is difficult to actively manage. Many actions, such as firmware updates of storage drives, require the computing system or controller to stop using the storage drives in order to perform the action.

Existing techniques for parity based data protection such as Redundant Array of Inexpensive Disks (RAID) are facing declining adoption, especially in the fastest growing markets such as cloud and service provider.

Explicit spare capacity for storing redundancy information must be provisioned within a group of storage drives in advance and is not usable by the computing system despite having both acquisition and operational cost.

When using RAID, write operations must first read a subset of the previously written data in order to correctly calculate the new parity information before the write can be completed. This Read-Modify-Write (RMW) process degrades performance significantly.

Existing RAID solutions primarily use a monolithic view of the storage drives as described above. Fractional failures within a storage drive may cause the full capacity of the storage drives to rebuild rather than just the failed fraction. Since the performance seen by the computing system during a storage drive rebuild can degrade significantly, users want the rebuild time minimized. However, the rebuild of a single failure within a RAID solution utilizing high capacity storage drives can take multiple days.

The monolithic view used by existing RAID solutions prevents them from understanding the internal organization of storage drives. Therefore, the RAID solution may use a group of storage drives and map the RAID group across those storage drives.

Advantages of the disclosed technologies include logically increasing capacity of physical storage drives. The disclosed smart controller actively manages physical storage drives. A disclosed controller insulates applications against both real and false failures and reduces or eliminates customer interventions for physical storage drive events. The solution is implemented in an intelligent way without impairing application performance. Further, the disclosed controller has the ability to hide the complexity of new storage technologies (e.g., shingled magnetic recording, etc.) while preserving the benefits. Therefore, the disclosed technologies do not need to force a change in deployment architecture.

On the other hand, the disclosed technologies maintain data storage operations in the level of physical blocks. When a physical block is damaged, the whole physical storage drive does not become useless. Rather, the disclosed technologies adopt another available physical block to repair the damaged physical block. Advantages of the technologies include reducing failure rates and reducing warranty costs. The disclosed technologies further benefit IT operators by increasing the lifetime of storage drives, reducing operational expenditure, lowering overhead for rebuilds, and minimizing data privacy concerns. In addition, the technologies ease the management of storage drives.

In one aspect, disclosed herein is a method for improving data storage reliability and efficiency, the method comprising: (a) creating at least one logical storage drive comprising a plurality of logical blocks; (b) mapping the at least one logical storage drive to at least one physical storage drive based on many-to-one mapping or one-to-many mapping, wherein the at least one physical storage drive comprises a plurality of physical blocks; and (c) applying a compression algorithm to data held in one or more logical blocks, aggregating units of the data, and storing the units of the data into one or more physical blocks. In some embodiments, the method further comprises connecting to the at least one physical storage drive based on one or more of the following: a small computing system interface (SCSI), a serial attached SCSI (SAS), a serial at attachment (SATA), an Internet SCSI (iSCSI), a fiber channel, an InfiniBand, a peripheral component interconnect (PCI), and a peripheral component interconnect express (PCIe). In some embodiments, the at least one physical storage drive comprises one or more of the following: a hard drive, a solid-state drive, an optical drive, and a tape drive. In some embodiments, a number of the plurality of logical blocks is larger than a number of physical blocks used to map the plurality of logical blocks. In some embodiments, the mapping comprises mapping at least two logical blocks to a physical block. In some embodiments, the mapping comprises mapping at least two physical blocks to a logical block. In some embodiments, the method further comprises transforming access to the at least one logical storage drive into a process of accessing to the at least one physical storage drive. In some embodiments, the method further comprises assigning the at least one logical storage drive with a logical unit number. In some embodiments, the method further comprises associating a logical block with a logical block address. In some embodiments, the method further comprises receiving a request from a computing system to write the data, wherein the computing system provides an associated logical block address of the data. In additional embodiments, the method further comprises responding to the request to write the data. In additional embodiments, the method further comprises copying the data from the one or more logical blocks to one or more non-transitory media and tracking an associated logical block address. In additional embodiments, the one or more non-transitory media preserve the data during the data write when power outage happens. In some embodiments, the one or more non-transitory media comprise one or more of: a non-volatile memory, a solid state drive, torque spin transfer memory, phase change memory, resistive RAM, and the at least one physical storage drive. In additional embodiments, the data is in a compressed form when the data is compressible, or is in an original form when the data is incompressible, or is in the original form when the applying the compression algorithm is performed after the copying the data. In some embodiments, the method further comprises deleting the data from the one or more non-transitory media upon the data is stored in the one or more physical blocks. In some embodiments, the method further comprises acknowledging completion of writing the data to the computing system. In some embodiments, the acknowledging is not made until the data held in the one or more logical blocks is completely written into the one or more non-transitory media. In some embodiments, the acknowledging is not made until the data held in the one or more logical blocks is completely written into the one or more physical blocks. In some embodiments, the method further comprises receiving a request from a computing system to read requested data, wherein the computing system provides an associated logical block address of the requested data. In some embodiments, the method further comprises determining if the requested data is in one or more non-transitory media. In some embodiments, the one or more non-transitory media comprise one or more of: a non-volatile memory, a solid state drive, torque spin transfer memory, phase change memory, resistive RAM, and the at least one physical storage drive. In some embodiments, the method further comprises, when the requested data is in the one or more non-transitory media, returning the requested data to the computing system from the one or more non-transitory media. In some embodiments, the method further comprises, when the requested data is not in the one or more non-transitory media, determining if the requested data is in a compressed form in the at least one physical storage drive. In some embodiments, the method further comprises, when the requested data is in the compressed form, reading the requested data from the one or more physical blocks, decompressing the requested data and returning the requested data to the computing system. In some embodiments, the method further comprises, when the requested data is not in the compressed form, reading the requested data from the one or more physical blocks and returning the requested data to the computing system. In some embodiments, the method further comprises claiming a free storage space by analyzing the plurality of physical blocks and the plurality of logical blocks. In some embodiments, the analyzing comprises evaluating statistics of occupied physical blocks and vacant physical blocks. In some embodiments, the analyzing comprises evaluating a percentage of valid logical blocks and re-written logical blocks mapped into the one or more physical blocks. In some embodiments, the analyzing comprises comparing valid logical blocks and invalid logical blocks on a physicalblock-by-physical-block basis to identify one or more candidate physical blocks for the claiming the free storage space. In some embodiments, the claiming the free storage space comprises combining a first set of logical blocks from a first set of physical blocks and a second set of logical blocks from a second set of physical blocks into a third set of physical blocks without transferring stored data into and out of the at least one physical storage drive. In some embodiments, the at least one logical storage drive comprises at least one protected logical storage drive. In some embodiments, the method further comprises receiving a request from a computing system to write the data to the at least one protected logical storage drive, wherein the computing system provides associated logical block addresses of one or more logical blocks of the data. In some embodiments, the method further comprises concatenating the one or more logical blocks to form a data unit. In some embodiments, the method further comprises segmenting the data unit into data sub-units. In some embodiments, the method further comprises performing error-correction coding on the data sub-units. In some embodiments, the applying the compression algorithm, the aggregating, and the segmenting are performed in an arbitrary order. In some embodiments, the method further comprises generating redundancy sub-units from the data sub-units. In some embodiments, the method further comprises writing the data sub-units and the redundancy sub-units into the at least one physical storage drive. In some embodiments, the method further comprises receiving a request from a computing system to read requested data from the at least one protected logical storage drive, wherein the computing system provides associated logical block addresses of one or more logical blocks of the requested data. In some embodiments, the method further comprises reading data sub-units of the requested data from the at least one physical storage drive. In some embodiments, the method further comprises reading redundancy sub-units of the requested data from the at least one physical storage drive. In some embodiments, the method further comprises generating missing data sub-units of the requested data using the redundancy sub-units. In some embodiments, the method further comprises concatenating the data sub-units to form a data unit. In some embodiments, the method further comprises determining if the data unit is in a compressed form. In some embodiments, the method further comprises, when the data unit is in the compressed form, traversing headers of the data unit to identify logical block addresses. In some embodiments, the method further comprises, when the data unit is in the compressed form, decompressing the data unit and returning the requested data to the computing system. In some embodiments, the method further comprises, when the data unit is not in the compressed form, returning the requested data to the computing system. In some embodiments, the method further comprises protecting the data by encrypting the data. In some embodiments, the method further comprises encrypting the data by an encryption key. In some embodiments, the method further comprises creating a spare and unused storage capacity through the compression algorithm in the at least one physical storage drive. In some embodiments, the method further comprises using the spare and unused storage capacity to remap a failed physical block of the at least one physical storage drive, the failed physical block occurring without warning. In some embodiments, the method further comprises failing a first logical drive mapped into the failed physical block to a computing system. In some embodiments, the method further comprises creating a new mapping for a second logical drive, wherein (a) the second logical drive replaces the first logical drive and (b) the new mapping excludes the failed physical block and replaces the failed physical block with a second physical block. In some embodiments, the second physical block is located in the spare and unused storage capacity. In some embodiments, the method further comprises presenting the second logical drive to a computing system. In some embodiments, the method further comprises using the spare and unused storage capacity to remap a predicted-to-be-failed physical block of the at least one physical storage drive, the predicted-to-be-failed physical block occurring with a warning of a future failure. In some embodiments, the method further comprises receiving a notification of the future failure. In some embodiments, the method further comprises mapping a set of logical blocks associated with the predicted-to-be-failed physical block to a second physical block, wherein the second physical block is in the spare and unused storage capacity. In some embodiments, the method further comprises migrating data from the predicted-to-be-failed physical block into the second physical block. In some embodiments, the method further comprises, upon completion of the migrating, dissociating the predicted-to-be-failed physical block from the set of logical blocks. In some embodiments, the method further comprises using the spare and unused storage capacity to expand a logical capacity of the at least one logical storage drive. In some embodiments, the logical capacity viewed by a computing system is larger than a physical capacity of associated physical blocks. In some embodiments, the logical capacity is derived by past entropy or expected future entropy of writes to the at least one logical storage drive. In some embodiments, the method further comprises using the spare and unused storage capacity to store redundancy information. In some embodiments, the method further comprises creating redundancy information for new data write without a need to read back previous writes. In some embodiments, the applying the compression algorithm and the aggregating the units of the data are performed in an arbitrary order. In some embodiments, the method is implemented based on one or more of the following: a peripheral component interconnect (PCI) card, a peripheral component interconnect express (PCIe) card, field programmable gate arrays (FPGA), application specific integrated circuit (ASIC), and computing cycles of a processor.

In another aspect, disclosed herein is a method for improving data storage reliability and efficiency, the method comprising: (a) creating at least one logical storage drive comprising a plurality of logical blocks; (b) mapping the at least one logical storage drive into at least one physical storage drive based on many-to-one mapping or one-to-many mapping, wherein the at least one physical storage drive comprises a plurality of physical blocks; and (c) applying a compression algorithm to data held in one or more logical blocks, aggregating units of the data, and storing the units of the data into one or more physical blocks. In some embodiments, a number of the plurality of logical blocks is larger than a number of physical blocks used to map the plurality of logical blocks. In some embodiments, the method further comprises transforming access to the at least one logical storage drive into access to the at least one physical storage drive. In some embodiments, the method further comprises receiving a request from a computing system to write the data, wherein the computing system provides an associated logical block address of the data. In some embodiments, the method further comprises copying the data from the one or more logical blocks to one or more non-transitory media and tracking an associated logical block address, wherein the one or more non-transitory media comprise one or more of: a non-volatile memory, a solid state drive, spin transfer torque memory, phase change memory, resistive RAM, and the at least one physical storage drive. In some embodiments, the data is in a compressed form when the data is compressible, or is in an original form when the data is incompressible, or is in the original form when the applying the compression algorithm is performed after the copying the data. In some embodiments, the method further comprises deleting the data from the one or more non-transitory media right after the data is stored in the one or more physical blocks. In some embodiments, the method further comprises acknowledging completion of writing the data to the computing system wherein the acknowledging is not made until the data held in the one or more logical blocks is completely written into the one or more non-transitory media. In some embodiments, the method further comprises detecting first data writes to be rewritten in the future more frequently than second data writes, wherein a) the first data writes are segregated and only form data units with other similar writes, b) the detecting first data writes comprises examining: the logical block address within the at least one logical storage drive, or an entropy level resulted from the applying the compression algorithm, or both. In some embodiments, the method further comprises receiving a request from a computing system to read requested data, wherein the computing system provides an associated logical block address of the requested data. In some embodiments, the method further comprises determining if the requested data is in one or more non-transitory media, wherein the one or more non-transitory media comprise one or more of: a non-volatile memory, a solid state drive, spin transfer torque memory, phase change memory, resistive RAM, and the at least one physical storage drive. In some embodiments, the method further comprises, when the requested data is in the one or more non-transitory media, returning the requested data to the computing system from the one or more non-transitory media. In some embodiments, the method further comprises, when the requested data is not in the one or more non-transitory media, determining if the requested data is in a compressed form in the at least one physical storage drive. In some embodiments, the method further comprises, when the requested data is in the compressed form, reading the requested data from the one or more physical blocks, traversing headers to identify the logical block address, decompressing the requested data, and returning the requested data to the computing system. In some embodiments, the method further comprises, when the requested data is not in the compressed form, reading the requested data from the one or more physical blocks and returning the requested data to the computing system. In some embodiments, the method further comprises claiming a free storage space by a) evaluating valid logical blocks mapped into the one or more physical blocks and b) copying and remapping the valid logical blocks from the one or more physical blocks to new physical blocks. In some embodiments, the claiming the free storage space further comprises copying and remapping a first set of valid logical blocks from a first set of physical blocks and a second set of valid logical blocks from a second set of physical blocks into a third set of physical blocks without transferring stored data into and out of the at least one physical storage drive. In some embodiments, a) the at least one logical storage drive comprises at least one protected logical storage drive receiving a request from a computing system to write the data to the at least one protected logical storage drive, b) the computing system provides associated logical block addresses of one or more logical blocks of the data, and c) the writing the data comprises: concatenating the one or more logical blocks of the data to form a data unit; segmenting the data unit to form data sub-units; performing error-correction coding on the data sub-units to generate redundancy sub-units; and writing the data sub-units and the redundancy sub-units into the at least one physical storage drive. In some embodiments, the writing data further comprises creating redundancy information for new write data without a need to read back previous writes. In some embodiments, a) the at least one logical storage drive comprises at least one protected logical storage drive receiving a request from a computing system to read requested data from the at least one protected logical storage drive and b) the computing system provides associated logical block addresses of one or more logical blocks of the requested data. In some embodiments, the reading the requested data comprises reading data sub-units of the requested data and concatenating the data sub-units to form a data unit. In some embodiments, the reading the requested data further comprises reading redundancy sub-units of the requested data from the at least one physical storage drive and generating missing data sub-units of the requested data using the redundancy sub-units. In some embodiments, the reading the requested data further comprises determining if the requested data is a compressed form. In some embodiments, the reading the requested data further comprises, when the requested data is in the compressed form, traversing headers of a data unit to identify logical block addresses, decompressing the requested data, and returning the requested data to the computing system. In some embodiments, the reading the requested data further comprises, when the requested data is not in the compressed form, returning the requested data to the computing system. In some embodiments, the method further comprises protecting the data by encrypting the data by an encryption key. In some embodiments, the method further comprises a) creating a spare and unused storage capacity through compressing data in the at least one physical storage drive and b) using the spare and unused storage capacity to remap a failed physical block of the at least one physical storage drive, wherein the failed physical block occurs without a warning and the remapping comprises: failing a first logical drive mapped into the failed physical block to a computing system; creating a new mapping for a second logical drive wherein the second logical drive replaces the first logical drive, the new mapping excludes the failed physical block and replaces the failed physical block with a second physical block located in the spare and unused storage capacity; and presenting the second logical drive to the computing system. In some embodiments, the method further comprises comprising a) creating a spare and unused storage capacity through compressing data in the at least one physical storage drive and b) using the spare and unused storage capacity to remap a predicted-to-be-failed physical block of the at least one physical storage drive, wherein the predicted-to-be-failed physical block occurs with a notified warning of a future failure and the remapping comprises: mapping a set of logical blocks into a second physical block, wherein the set of logical blocks is previously mapped into the predicted-to-be-failed physical block and the second physical block is in the spare and unused storage capacity; migrating data from the predicted-to-be-failed physical block into the second physical block; and upon completion of the migrating, dissociating the predicted-to-be-failed physical block from the set of logical blocks. In some embodiments, the method further comprises a) creating a spare and unused storage capacity through compressing data in the at least one physical storage drive and b) using the spare and unused storage capacity to expand a logical capacity of the at least one logical storage drive, wherein the logical capacity viewed by a computing system is larger than a physical capacity of mapped physical blocks and wherein the logical capacity is derived by past entropy or expected future entropy of writes to the at least one logical storage drive. In some embodiments, the method further comprises a) creating a spare and unused storage capacity through compressing data in the at least one physical storage drive and b) using the spare and unused storage capacity to store redundancy information.

In another aspect, disclosed herein is a device for improving data storage reliability and efficiency, the device comprising at least one processor: (a) creating at least one logical storage drive comprising a plurality of logical blocks; (b) mapping the at least one logical storage drive to at least one physical storage drive based on many-to-one mapping or one-to-many mapping, wherein the at least one physical storage drive comprises a plurality of physical blocks; and (c) applying a compression algorithm to data held in one or more logical blocks, aggregating units of the data, and storing the units of the data into one or more physical blocks. In some embodiments, the device further comprises a data interface connecting to the at least one physical storage drive based on one or more of the following: a small computing system interface (SCSI), a serial attached SCSI (SAS), a serial at attachment (SATA), an Internet SCSI (iSCSI), a fiber channel, an InfiniBand, a peripheral component interconnect (PCI), and a peripheral component interconnect express (PCIe). In some embodiments, the at least one physical storage drive comprises one or more of the following: a hard drive, a solid-state drive, an optical drive, and a tape drive. In some embodiments, a number of the plurality of logical blocks is larger than a number of physical blocks used to map the plurality of logical blocks. In some embodiments, the mapping comprises mapping at least two logical blocks to a physical block. In some embodiments, the mapping comprises mapping at least two physical blocks to a logical block. In some embodiments, the at least one processor further transforms access to the at least one logical storage drive into a process of accessing to the at least one physical storage drive. In some embodiments, the at least one processor further assigns the at least one logical storage drive with a logical unit number. In some embodiments, the at least one processor further associates a logical block with a logical block address. In some embodiments, the at least one processor further receives a request from a computing system to write the data, wherein the computing system provides an associated logical block address of the data. In some embodiments, the at least one processor further responds to the request to write the data. In some embodiments, the at least one processor further copies the data from the one or more logical blocks to one or more non-transitory media and tracking an associated logical block address. In some embodiments, the one or more non-transitory media preserve the data during the data write when power outage happens. In some embodiments, the one or more non-transitory media comprise one or more of: a non-volatile memory, a solid state drive, torque spin transfer memory, phase change memory, resistive RAM, and the at least one physical storage drive. In some embodiments, the data is in a compressed form when the data is compressible, or is in an original form when the data is incompressible, or is in the original form when the applying the compression algorithm is performed after the copying the data. In some embodiments, the at least one processor further deletes the data from the one or more non-transitory media upon the data is stored in the one or more physical blocks. In some embodiments, the at least one processor further acknowledges completion of writing the data to the computing system. In some embodiments, the acknowledging is not made until the data held in the one or more logical blocks is completely written into the one or more non-transitory media. In some embodiments, the at least one processor further detects first data writes to be rewritten in the future more frequently than second data writes, wherein a) the first data writes are segregated and only form data units with other similar writes, b) the detecting first data writes comprises examining: the logical block address within the at least one logical storage drive, or an entropy level resulted from the applying the compression algorithm, or both. In some embodiments, the at least one processor further receives a request from a computing system to read requested data, wherein the computing system provides an associated logical block address of the requested data. In some embodiments, the at least one processor further determines if the requested data is in one or more non-transitory media. In some embodiments, the one or more non-transitory media comprise one or more of: a non-volatile memory, a solid state drive, torque spin transfer memory, phase change memory, resistive RAM, and the at least one physical storage drive. In some embodiments, the at least one processor further, when the requested data is in the one or more non-transitory media, returns the requested data to the computing system from the one or more non-transitory media. In some embodiments, the at least one processor further, when the requested data is not in the one or more non-transitory media, determines if the requested data is in a compressed form in the at least one physical storage drive. In some embodiments, the at least one processor further, when the requested data is in the compressed form, reads the requested data from the one or more physical blocks, decompressing the requested data and returning the requested data to the computing system. In some embodiments, the at least one processor further, when the requested data is not in the compressed form, reads the requested data from the one or more physical blocks and returning the requested data to the computing system. In some embodiments, the at least one processor further claims a free storage space by analyzing the plurality of physical blocks and the plurality of logical blocks. In some embodiments, the analyzing comprises evaluating statistics of occupied physical blocks and vacant physical blocks. In some embodiments, the analyzing comprises evaluating a percentage of valid logical blocks and re-written logical blocks mapped into the one or more physical blocks. In some embodiments, the analyzing comprises comparing valid logical blocks and invalid logical blocks on a physical-block-by-physical-block basis to identify one or more candidate physical blocks for the claiming the free storage space. In some embodiments, the claiming the free storage space comprises combining a first set of logical blocks from a first set of physical blocks and a second set of logical blocks from a second set of physical blocks into a third set of physical blocks without transferring stored data into and out of the at least one physical storage drive. In some embodiments, the at least one logical storage drive comprises at least one protected logical storage drive. In some embodiments, the at least one processor further receives a request from a computing system to write the data to the at least one protected logical storage drive, wherein the computing system provides associated logical block addresses of one or more logical blocks of the data. In some embodiments, the at least one processor further concatenates the one or more logical blocks to form a data unit. In some embodiments, the at least one processor further segments the data unit into data sub-units. In some embodiments, the at least one processor further performs error-correction coding on the data sub-units. In some embodiments, the applying the compression algorithm, the aggregating, and the segmenting are performed in an arbitrary order. In some embodiments, the at least one processor further generates redundancy sub-units from the data sub-units. In some embodiments, the at least one processor further writes the data sub-units and the redundancy sub-units into the at least one physical storage drive. In some embodiments, the at least one processor further receives a request from a computing system to read requested data from the at least one protected logical storage drive, wherein the computing system provides associated logical block addresses of one or more logical blocks of the requested data. In some embodiments, the at least one processor further reads data sub-units of the requested data from the at least one physical storage drive. In some embodiments, the at least one processor further reads redundancy sub-units of the requested data from the at least one physical storage drive. In some embodiments, the at least one processor further generates missing data sub-units of the requested data using the redundancy sub-units In some embodiments, the at least one processor further concatenates the data sub-units to form a data unit. In some embodiments, the at least one processor further determines if the data unit is in a compressed form. In some embodiments, the at least one processor further, when the data unit is in the compressed form, traverses headers of the data unit to identify logical block addresses. In some embodiments, the at least one processor further, when the data unit is in the compressed form, decompresses the data unit and returning the requested data to the computing system. In some embodiments, the at least one processor further, when the data unit is not in the compressed form, returns the requested data to the computing system. In some embodiments, the at least one processor further protects the data by encrypting the data. In some embodiments, the at least one processor further encrypts the data by an encryption key. In some embodiments, the at least one processor further creates a spare and unused storage capacity through compression in the at least one physical storage drive. In some embodiments, the at least one processor further uses the spare and unused storage capacity to remap a failed physical block of the at least one physical storage drive, the failed physical block occurring without warning. In some embodiments, the at least one processor further fails a first logical drive mapped into the failed physical block to a computing system. In some embodiments, the at least one processor further creates a new mapping for a second logical drive, wherein (a) the second logical drive replaces the first logical drive, (b) the new mapping excludes the failed physical block and replaces the failed physical block with a second physical block. In some embodiments, the second physical block is located in the spare and unused storage capacity. In some embodiments, the at least one processor further presents the second logical drive to a computing system. In some embodiments, the at least one processor further uses the spare and unused storage capacity to remap a predicted-to-be-failed physical block of the at least one physical storage drive, the predicted-to-be-failed physical block occurring with a warning of a future failure. In some embodiments, the at least one processor further receives a notification of the future failure. In some embodiments, the at least one processor further maps a set of logical blocks associated with the predicted-to-be-failed physical block to a second physical block, wherein the second physical block is in the spare and unused storage capacity. In some embodiments, the at least one processor further migrates data from the predicted-to-be-failed physical block into the second physical block. In some embodiments, the at least one processor further, upon completion of the migrating, dissociates the predicted-to-be-failed physical block from the set of logical blocks. In some embodiments, the at least one processor further uses the spare and unused storage capacity to expand a logical capacity of the at least one logical storage drive. In some embodiments, the logical capacity viewed by a computing system is larger than a physical capacity of associated physical blocks. In some embodiments, the logical capacity is derived by past entropy or expected future entropy of writes to the at least one logical storage drive. In some embodiments, the at least one processor further uses the spare and unused storage capacity to store redundancy information. In some embodiments, the at least one processor further creates redundancy information for new data write without a need to read back previous writes. In some embodiments, the applying the compression algorithm and the aggregating the units of the data are performed in an arbitrary order. In some embodiments, the at least one processor is implemented based on one or more of the following: a peripheral component interconnect (PCI) card, a peripheral component interconnect express (PCIe) card, field programmable gate arrays (FPGA), application specific integrated circuit (ASIC), and computing cycles of a processor. In some embodiments, the creating at least one logical storage drive is performed by a first processor of the at least one processor. In some embodiments, the mapping is performed by a first processor of the at least one processor. In some embodiments, the applying a compression is performed by a second processor of the at least one processor. In some embodiments, applying encryption is performed by a second processor of the at least one processor. In some embodiments, applying segmentation is performed by a second processor of the at least one processor. In some embodiments, applying parity generation is performed by a second processor of the at least one processor.

In another aspect, disclosed herein is a device for improving data storage reliability and efficiency, the device comprising at least one processor: (a) creating at least one logical storage drive comprising a plurality of logical blocks; (b) mapping the at least one logical storage drive into at least one physical storage drive based on many-to-one mapping or one-to-many mapping, wherein the at least one physical storage drive comprises a plurality of physical blocks; and (c) applying a compression algorithm to data held in one or more logical blocks, aggregating units of the data, and storing the units of the data into one or more physical blocks. In some embodiments, a number of the plurality of logical blocks is larger than a number of physical blocks used to map the plurality of logical blocks. In some embodiments, the at least one processor further transforms access to the at least one logical storage drive into access to the at least one physical storage drive. In some embodiments, the at least one processor further receives a request from a computing system to write the data, wherein the computing system provides an associated logical block address of the data. In some embodiments, the at least one processor further copies the data from the one or more logical blocks to one or more non-transitory media and tracks an associated logical block address, wherein the one or more non-transitory media comprise one or more of: a non-volatile memory, a solid state drive, spin transfer torque memory, phase change memory, resistive RAM, and the at least one physical storage drive. In some embodiments, the data is in a compressed form when the data is compressible, or is in an original form when the data is incompressible, or is in the original form when the applying the compression algorithm is performed after the copying the data. In some embodiments, the at least one processor further deletes the data from the one or more non-transitory media right after the data is stored in the one or more physical blocks. In some embodiments, the at least one processor further acknowledges completion of writing the data to the computing system wherein the acknowledging is not made until the data held in the one or more logical blocks is completely written into the one or more non-transitory media. In some embodiments, the at least one processor further acknowledges completion of writing the data to the computing system wherein the acknowledging is not made until the data held in the one or more logical blocks is completely written into the one or more physical blocks. In some embodiments, the at least one processor further receives a request from a computing system to read requested data, wherein the computing system provides an associated logical block address of the requested data. In some embodiments, the at least one processor further determines if the requested data is in one or more non-transitory media, wherein the one or more non-transitory media comprise one or more of: a non-volatile memory, a solid state drive, spin transfer torque memory, phase change memory, resistive RAM, and the at least one physical storage drive. In some embodiments, the at least one processor further, when the requested data is in the one or more non-transitory media, returns the requested data to the computing system from the one or more non-transitory media. In some embodiments, the at least one processor further, when the requested data is not in the one or more non-transitory media, determines if the requested data is in a compressed form in the at least one physical storage drive. In some embodiments, the at least one processor further, when the requested data is in the compressed form, reads the requested data from the one or more physical blocks, traverses headers to identify the logical block address, decompresses the requested data, and returns the requested data to the computing system. In some embodiments, the at least one processor further, when the requested data is not in the compressed form, reads the requested data from the one or more physical blocks and returns the requested data to the computing system. In some embodiments, the at least one processor further claims a free storage space by a) evaluating valid logical blocks mapped into the one or more physical blocks and b) copying and remapping the valid logical blocks from the one or more physical blocks to new physical blocks. In some embodiments, the claiming the free storage space further comprises copying and remapping a first set of valid logical blocks from a first set of physical blocks and a second set of valid logical blocks from a second set of physical blocks into a third set of physical blocks without transferring stored data into and out of the at least one physical storage drive. In some embodiments, a) the at least one logical storage drive comprises at least one protected logical storage drive receiving a request from a computing system to write data to the at least one protected logical storage drive, b) the computing system provides associated logical block addresses of one or more logical blocks of the data, and c) the writing data comprises: concatenating the one or more logical blocks of the data to form a data unit; segmenting the data unit to form data sub-units; performing error-correction coding on the data sub-units to generate redundancy sub-units; and writing the data sub-units and the redundancy sub-units into the at least one physical storage drive. In some embodiments, the writing data further comprises creating redundancy information for new write data without a need to read back previous writes. In some embodiments, a) the at least one logical storage drive comprises at least one protected logical storage drive receiving a request from a computing system to read requested data from the at least one protected logical storage drive and b) the computing system provides associated logical block addresses of one or more logical blocks of the requested data. In some embodiments, the reading the requested data comprises reading data sub-units of the requested data and concatenating the data sub-units to form a data unit. In some embodiments, the reading the requested data further comprises reading redundancy sub-units of the requested data from the at least one physical storage drive and generating missing data sub-units of the requested data using the redundancy sub-units. In some embodiments, the reading the requested data further comprises determining if the requested data is a compressed form. In some embodiments, the reading the requested data further comprises, when the requested data is in the compressed form, traversing headers of a data unit to identify logical block addresses, decompressing the requested data, and returning the requested data to the computing system. In some embodiments, the reading the requested data further comprises, when the requested data is not in the compressed form, returning the requested data to the computing system. In some embodiments, the at least one processor further protects the data by encrypting the data by an encryption key. In some embodiments, the at least one processor further a) creates a spare and unused storage capacity through compressing data in the at least one physical storage drive and b) uses the spare and unused storage capacity to remap a failed physical block of the at least one physical storage drive, wherein the failed physical block occurs without a warning and the remapping comprises: failing a first logical drive mapped into the failed physical block to a computing system; creating a new mapping for a second logical drive wherein the second logical drive replaces the first logical drive, the new mapping excludes the failed physical block and replaces the failed physical block with a second physical block located in the spare and unused storage capacity; and presenting the second logical drive to the computing system. In some embodiments, the at least one processor further a) creates a spare and unused storage capacity through compressing data in the at least one physical storage drive and b) uses the spare and unused storage capacity to remap a predicted-to-be-failed physical block of the at least one physical storage drive, wherein the predicted-to-be-failed physical block occurs with a notified warning of a future failure and the remapping comprises: mapping a set of logical blocks into a second physical block, wherein the set of logical blocks is previously mapped into the predicted-to-be-failed physical block and the second physical block is in the spare and unused storage capacity; migrating data from the predicted-to-be-failed physical block into the second physical block; and upon completion of the migrating, dissociating the predicted-to-be-failed physical block from the set of logical blocks. In some embodiments, the at least one processor further a) creates a spare and unused storage capacity through compressing data in the at least one physical storage drive and b) uses the spare and unused storage capacity to expand a logical capacity of the at least one logical storage drive, wherein the logical capacity viewed by a computing system is larger than a physical capacity of mapped physical blocks and wherein the logical capacity is derived by past entropy or expected future entropy of writes to the at least one logical storage drive. In some embodiments, the at least one processor further a) creates a spare and unused storage capacity through compressing data in the at least one physical storage drive and b) uses the spare and unused storage capacity to store redundancy information.

In another aspect, disclosed herein are non-transitory computer-readable storage media encoded with a computer program including instructions executable by at least one processor to improve data storage reliability and efficiency, the computer program comprising: (a) machine instructions creating at least one logical storage drive comprising a plurality of logical blocks; (b) machine instructions mapping the at least one logical storage drive to at least one physical storage drive based on many-to-one mapping or one-to-many mapping, wherein the at least one physical storage drive comprises a plurality of physical blocks; and (c) machine instructions applying a compression algorithm to data held in one or more logical blocks, aggregating units of the data, and storing the units of the data into one or more physical blocks. In some embodiments, the computer program further comprises machine instructions connecting to the at least one physical storage drive based on one or more of the following: a small computing system interface (SCSI), a serial attached SCSI (SAS), a serial at attachment (SATA), an Internet SCSI (iSCSI), a fiber channel, an InfiniBand, a peripheral component interconnect (PCI), and a peripheral component interconnect express (PCIe). In some embodiments, the at least one physical storage drive comprises one or more of the following: a hard drive, a solid-state drive, an optical drive, and a tape drive. In some embodiments, a number of the plurality of logical blocks is larger than a number of physical blocks used to map the plurality of logical blocks. In some embodiments, the mapping comprises mapping at least two logical blocks to a physical block. In some embodiments, the mapping comprises mapping at least two physical blocks to a logical block. In some embodiments, the computer program further comprises machine instructions transforming access to the at least one logical storage drive into a process of accessing to the at least one physical storage drive. In some embodiments, the computer program further comprises machine instructions assigning the at least one logical storage drive with a logical unit number. In some embodiments, the computer program further comprises machine instructions associating a logical block with a logical block address. In some embodiments, the computer program further comprises machine instructions receiving a request from a computing system to write the data, wherein the computing system provides an associated logical block address of the data. In some embodiments, the computer program further comprises machine instructions responding to the request to write the data. In some embodiments, the computer program further comprises machine instructions copying the data from the one or more logical blocks to one or more non-transitory media and tracking an associated logical block address. In some embodiments, the one or more non-transitory media preserve the data during the data write when power outage happens. In some embodiments, the one or more non-transitory media comprise one or more of: a non-volatile memory, a solid state drive, torque spin transfer memory, phase change memory, resistive RAM, and the at least one physical storage drive. In some embodiments, the data is in a compressed form when the data is compressible, or is in an original form when the data is incompressible, or is in the original form when the applying the compression algorithm is performed after the copying the data. In some embodiments, the computer program further comprises machine instructions deleting the data from the one or more non-transitory media upon the data is stored in the one or more physical blocks. In some embodiments, the computer program further comprises machine instructions acknowledging completion of writing the data to the computing system. In some embodiments, the acknowledging is not made until the data held in the one or more logical blocks is completely written into the one or more non-transitory media. In some embodiments, the acknowledging is not made until the data held in the one or more logical blocks is completely written into the one or more physical blocks. In some embodiments, the computer program further comprises machine instructions receiving a request from a computing system to read requested data, wherein the computing system provides an associated logical block address of the requested data. In some embodiments, the computer program further comprises machine instructions determining if the requested data is in one or more non-transitory media. In some embodiments, the one or more non-transitory media comprise one or more of: a non-volatile memory, a solid state drive, torque spin transfer memory, phase change memory, resistive RAM, and the at least one physical storage drive. In some embodiments, the computer program further comprises machine instructions, when the requested data is in the one or more non-transitory media, returning the requested data to the computing system from the one or more non-transitory media. In some embodiments, the computer program further comprises machine instructions, when the requested data is not in the one or more non-transitory media, determining if the requested data is in a compressed form in the at least one physical storage drive. In some embodiments, the computer program further comprises machine instructions, when the requested data is in the compressed form, reading the requested data from the one or more physical blocks, decompressing the requested data and returning the requested data to the computing system. In some embodiments, the computer program further comprises machine instructions, when the requested data is not in the compressed form, reading the requested data from the one or more physical blocks and returning the requested data to the computing system. In some embodiments, the computer program further comprises machine instructions claiming a free storage space by analyzing the plurality of physical blocks and the plurality of logical blocks. In some embodiments, the analyzing comprises evaluating statistics of occupied physical blocks and vacant physical blocks. In some embodiments, the analyzing comprises evaluating a percentage of valid logical blocks and re-written logical blocks mapped into the one or more physical blocks. In some embodiments, the analyzing comprises comparing valid logical blocks and invalid logical blocks on a physical-block-by-physical-block basis to identify one or more candidate physical blocks for the claiming the free storage space. In some embodiments, the claiming the free storage space comprises combining a first set of logical blocks from a first set of physical blocks and a second set of logical blocks from a second set of physical blocks into a third set of physical blocks without transferring stored data into and out of the at least one physical storage drive. In some embodiments, the at least one logical storage drive comprises at least one protected logical storage drive. In some embodiments, the computer program further comprises machine instructions receiving a request from a computing system to write the data to the at least one protected logical storage drive, wherein the computing system provides associated logical block addresses of one or more logical blocks of the data. In some embodiments, the computer program further comprises machine instructions concatenating the one or more logical blocks to form a data unit. In some embodiments, the computer program further comprises machine instructions segmenting the data unit into data sub-units. In some embodiments, the computer program further comprises machine instructions performing error-correction coding on the data sub-units. In some embodiments, the applying the compression algorithm, the aggregating, and the segmenting are performed in an arbitrary order. In some embodiments, the computer program further comprises machine instructions generating redundancy sub-units from the data sub-units. In some embodiments, the computer program further comprises machine instructions writing the data sub-units and the redundancy sub-units into the at least one physical storage drive. In some embodiments, the computer program further comprises machine instructions receiving a request from a computing system to read requested data from the at least one protected logical storage drive, wherein the computing system provides associated logical block addresses of one or more logical blocks of the requested data. In some embodiments, the computer program further comprises machine instructions reading data sub-units of the requested data from the at least one physical storage drive. In some embodiments, the computer program further comprises machine instructions reading redundancy sub-units of the requested data from the at least one physical storage drive. In some embodiments, the computer program further comprises machine instructions generating missing data sub-units of the requested data using the redundancy sub-units. In some embodiments, the computer program further comprises machine instructions concatenating the data sub-units to form a data unit. In some embodiments, the computer program further comprises machine instructions determining if the data unit is in a compressed form. In some embodiments, the computer program further comprises machine instructions, when the data unit is in the compressed form, traversing headers of the data unit to identify logical block addresses. In some embodiments, the computer program further comprises machine instructions, when the data unit is in the compressed form, decompressing the data unit and returning the requested data to the computing system. In some embodiments, the computer program further comprises machine instructions, when the data unit is not in the compressed form, returning the requested data to the computing system. In some embodiments, the computer program further comprises machine instructions protecting the data by encrypting the data. In some embodiments, the computer program further comprises machine instructions encrypting the data by an encryption key. In some embodiments, the computer program further comprises machine instructions creating a spare and unused storage capacity through compression in the at least one physical storage drive. In some embodiments, the computer program further comprises machine instructions using the spare and unused storage capacity to remap a failed physical block of the at least one physical storage drive, the failed physical block occurring without warning. In some embodiments, the computer program further comprises machine instructions failing a first logical drive mapped into the failed physical block to a computing system In some embodiments, the computer program further comprises machine instructions creating a new mapping for a second logical drive, wherein (a) the second logical drive replaces the first logical drive, (b) the new mapping excludes the failed physical block and replaces the failed physical block with a second physical block. In some embodiments, the second physical block is located in the spare and unused storage capacity. In some embodiments, the computer program further comprises machine instructions presenting the second logical drive to a computing system. In some embodiments, the computer program further comprises machine instructions using the spare and unused storage capacity to remap a predicted-to-be-failed physical block of the at least one physical storage drive, the predicted-to-be-failed physical block occurring with a warning of a future failure. In some embodiments, the computer program further comprises machine instructions receiving a notification of the future failure. In some embodiments, the computer program further comprises machine instructions mapping a set of logical blocks associated with the predicted-to-be-failed physical block to a second physical block, wherein the second physical block is in the spare and unused storage capacity. In some embodiments, the computer program further comprises machine instructions migrating data from the predicted-to-be-failed physical block into the second physical block. In some embodiments, the computer program further comprises machine instructions, upon completion of the migrating, dissociating the predicted-to-be-failed physical block from the set of logical blocks. In some embodiments, the computer program further comprises machine instructions using the spare and unused storage capacity to expand a logical capacity of the at least one logical storage drive. In some embodiments, the logical capacity viewed by a computing system is larger than a physical capacity of associated physical blocks. In some embodiments, the logical capacity is derived by past entropy or expected future entropy of writes to the at least one logical storage drive. In some embodiments, the computer program further comprises machine instructions using the spare and unused storage capacity to store redundancy information. In some embodiments, the computer program further comprises machine instructions creating redundancy information for new data write without a need to read back previous writes. In some embodiments, the applying the compression algorithm and the aggregating the units of the data are performed in an arbitrary order. In some embodiments, the computer program is implemented based on one or more of the following: a peripheral component interconnect (PCI) card, a peripheral component interconnect express (PCIe) card, field programmable gate arrays (FPGA), application specific integrated circuit (ASIC), and computing cycles of a processor.

DETAILED DESCRIPTION OF THE TECHNOLOGIES

Figure 1:
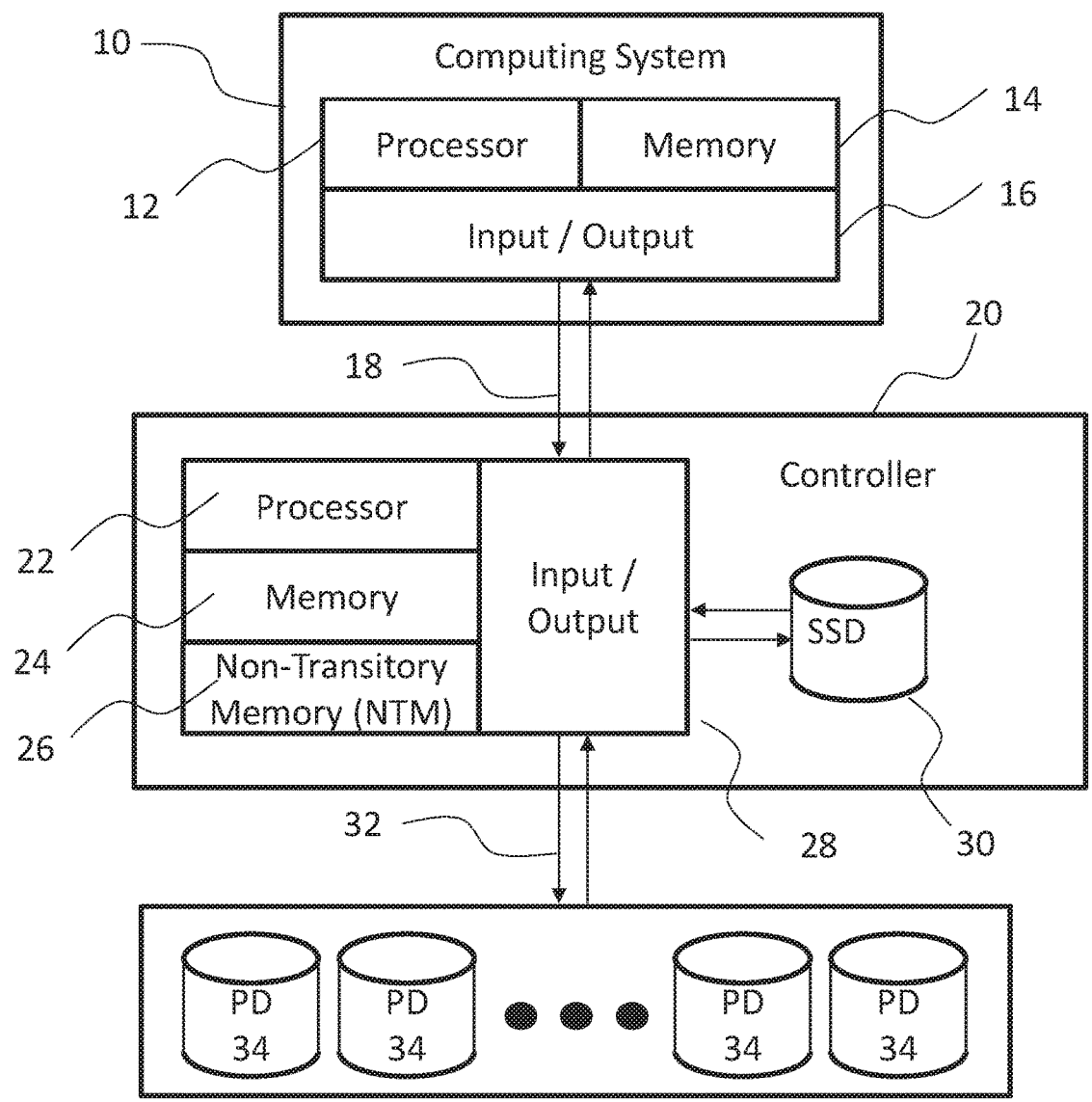
FIG. 1 shows an exemplary diagram of a computing system connected to an example storage controller and physical storage drives.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

Data storage demand is growing exponentially. The disclosed technologies virtually increase capacity of storage drives and actively manage them to insulate computing systems (including software applications running on the computing systems) against both real and false failures. A storage controller, described herein in the form of methods, devices, and media, uses virtualization and compression to allow a computing system to utilize one or more storage drives in a more efficient manner without changing the design or implementation of a computing system or a storage drive. Importantly, the disclosed storage controller is suitable for modern data center architecture.

In one aspect, disclosed herein are methods for improving data storage reliability and efficiency, the method comprising: creating at least one logical storage drive comprising a plurality of logical blocks; mapping the at least one logical storage drive to at least one physical storage drive based on many-to-one mapping or one-to-many mapping, wherein the at least one physical storage drive comprises a plurality of physical blocks; and applying a compression algorithm to data held in one or more logical blocks, aggregating units of the data, and storing the units of the data into one or more physical blocks.

In another aspect, disclosed herein are devices for improving data storage reliability and efficiency, the device comprising at least one processor: creating at least one logical storage drive comprising a plurality of logical blocks; mapping the at least one logical storage drive to at least one physical storage drive based on many-to-one mapping or one-to-many mapping, wherein the at least one physical storage drive comprises a plurality of physical blocks; and applying a compression algorithm to data held in one or more logical blocks, aggregating units of the data, and storing the units of the data into one or more physical blocks.

In yet another aspect, disclosed herein are non-transitory computer-readable storage media encoded with a computer program including instructions executable by at least one processor to improve data storage reliability and efficiency, the computer program comprising: machine instructions creating at least one logical storage drive comprising a plurality of logical blocks; machine instructions mapping the at least one logical storage drive to at least one physical storage drive based on many-to-one mapping or one-to-many mapping, wherein the at least one physical storage drive comprises a plurality of physical blocks; and machine instructions applying a compression algorithm to data held in one or more logical blocks, aggregating units of the data, and storing the units of the data into one or more physical blocks.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Computing System means a digital processing device, or an operating system, or a hypervisor, or a file system, or a software application requesting a storage service; further details are described herein.

Physical Storage Drive or Physical Drive (PD) means one or more physical entities comprising storage media able to store digital bits of data; further details are described herein.

Physical Block means an addressable element within a physical storage drive; further details are described herein.

Logical Storage Drive or Logical Drive (LD) means a logically or virtually created storage device or a composed construct seen by a computing system; further details are described herein.

Logical Block means an addressable element within logical storage drive; further details are described herein.

Data Unit means an aggregated set of data; further details are described herein.

Non-Transitory Media (NTM) means, by ways of non-limiting examples, non-transitory memory, spin transfer torque memory, phase change memory, resistive RAM, and/or any physical storage drive; further details are described herein.

Controller or Processor means electronic circuitry able to perform one or more technical steps disclosed herein; a controller or a processor can be realized based on, by way of non-limiting examples, a peripheral component interconnect (PCI) card, a peripheral component interconnect express (PCIe) card, field programmable gate arrays (FPGA), application specific integrated circuit (ASIC), and/or computing cycles of a processor; further details are described herein.

Storage Drives

In various embodiments, the methods, device and media disclosed herein include a physical storage drive, or use of the same. A physical storage drive comprises a plurality of physical blocks. In some embodiments, a physical storage drive comprises one or more of the following: a hard drive, a solid-state drive, an optical drive, and a tape drive. In some embodiments, a physical storage drive comprises media. Media comprises one or more platters, discs, silicon die, tapes, or other physical elements with physical properties (magnetic fields, optical properties, stored charge, resistance, etc.) that are used to encode data bits.

In various embodiments, the methods, device and media disclosed herein include a logical storage drive, or use of the same. A logical storage drive comprises a plurality of logical blocks. In some embodiments, a logical storage drive is seen by a computing system and handles communications with the computing system. In some embodiments, the number of logical blocks is larger than the number of physical blocks being mapped to the logical blocks. Access to at least one logical storage drive is transformed into a process of accessing to the at least one physical storage drive. Details of the process are described herein.

In various embodiments, the methods, device and media disclosed herein include a data interface to access a physical storage drive, or use of the same. The interface connects to the at least one physical storage drive based on one or more of the following: a small computing system interface (SCSI), a serial attached SCSI (SAS), a serial at attachment (SATA), an Internet SCSI (iSCSI), a fiber channel, an InfiniBand, a peripheral component interconnect (PCI), and a peripheral component interconnect express (PCIe).

In some embodiments, an interface comprises a physical interface. In some embodiments, an interface comprises a virtual interface.

Mapping

In various embodiments, the methods, device and media disclosed herein include a mapping between at least one physical storage drive and at least one logical storage drive, or use of the same. In some embodiments, the mapping maps at least one logical storage drive to at least one physical storage drive based on one-to-one mapping, many-to-one mapping, or one-to-many mapping. In some embodiments, the mapping comprises mapping at least two logical blocks to a physical block. In some embodiments, the mapping comprises mapping one logical block to one physical block. In some embodiments, the mapping comprises mapping at least two physical blocks to a logical block.

In some embodiments, a mapping maps fixed length blocks from one or more storage drives to a computing system. In some embodiments, block level mapping solutions use linear maps or mapping tables. With these schemes, in some embodiments, one logical block maps to one physical block within the storage drives. In some designs, a system duplicates copies of the map to different storage drives, also known as mirroring.

In some embodiments, the controller configures internal data storage to track the mapping. Examples of internal data storage include, but not limited to, a non-transitory memory, a solid-state drive, spin transfer torque memory, phase change memory, resistive RAM, and the physical storage drive.

Data Write and Read

In various embodiments, the methods, device and media disclosed herein include a compression algorithm, or use of the same. In some embodiments, a compression algorithm is applied to data held in one or more logical blocks. In some embodiments, the compression algorithm is followed by aggregating units of the data and storing the units of the data into one or more physical blocks. In some embodiments, the compression algorithm is performed after aggregating units of data and before storing the data. In some embodiments, the compression algorithm is performed after both aggregating units of data and storing the data. In some cases, the compression algorithm is applied to data held in one or more physical blocks. Examples of compression algorithms include, but not limited to, LZ4, DEFLATE, LZF, standard, and the like.

In some embodiments, a logical storage drive is assigned with a logical unit number (e.g., drive 1, drive 2, etc.). In additional embodiments, a logical block address is associated with a logical block.

In some embodiments, a controller disclosed herein receives a request from a computing system to write data, wherein the computing system provides an associated logical block address of the data. In further embodiments, the controller responds to the request to write the data. The data write comprises copying the data from the one or more logical blocks to one or more non-transitory media and tracking a logical block or an associated logical block address. In some embodiments, the one or more NTM to preserve the data during the data write when power outage happens.

In a process of data write, the controller determines that the data is in a compressed form or in an original form. In some embodiments, the data is in a compressed form when the data is compressible, or is in an original form when the data is incompressible. In some applications, the data is in an original form because the compression algorithm has not been applied; for instance, the compression algorithm is applied after the data is written to a physical block. In additional embodiments, upon the data is stored in the one or more physical blocks, the controller deletes the data from the one or more non-transitory media. In some embodiments, the controller acknowledges completion of writing the data to the computing system. In some implementations, the acknowledging is not made until the data held in the one or more logical blocks is completely written into the one or more non-transitory media. In some cases, the acknowledging is not made until the data held in the one or more logical blocks is completely written into the one or more physical blocks. Note that the acknowledgement can be performed as early as the data is copied to the non-transitory media, or as late as the entire process of the write is complete, or at any time during this period.

In some embodiments, a controller disclosed herein receives a request from a computing system to read requested data, wherein the computing system provides an associated logical block address of the requested data. In some embodiments, the controller determines if the requested data is in one or more non-transitory media.

The process of data read returns the requested data to the computing system from the one or more non-transitory media, when the requested data is in the one or more non-transitory media. When the requested data is not in the one or more non-transitory media, the controller determines if the requested data is in at least one physical storage drive. In some embodiments, during the process of data read, the controller determines if the requested data is in a compressed form. When the requested data is in the compressed form, the controller reads the requested data from one or more physical blocks, decompresses the requested data and returns the requested data to the computing system. In some cases, when the requested data is not in the compressed form, the controller reads the requested data from the one or more physical blocks and returns the requested data to the computing system.

In various embodiments, the methods, device and media disclosed herein include space reclamation, or use of the same. The controller claims a free storage space by analyzing physical blocks and logical blocks. In some embodiments, the analysis comprises evaluating statistics of occupied physical blocks and vacant physical blocks. In some embodiments, the analysis comprises evaluating a percentage of valid logical blocks and re-written logical blocks mapped into the one or more physical blocks. Some embodiments realize the analysis by comparing valid logical blocks and invalid logical blocks on a physical-block-by-physical-block basis to identify one or more candidate physical blocks for the claiming a free storage space.

In various embodiments, the methods, device and media disclosed herein include a data protection mechanism, or use of the same. In some embodiments, the controller is optionally configured to protect the data by encrypting the data. In further embodiments, encrypting the data is based on an encryption key.

In some embodiments, the controller segments the data. In some embodiments, the controller generates parity across segments of the data. In some embodiments, the controller performs error-correction codes on the data. Details are described herein.

In some embodiments, the actions of compression, segmentation, error-correction codes, encryption and aggregation are not ordered.

Implementation

In various embodiments, the methods, device and media disclosed herein are implemented based on one or more of the following: a peripheral component interconnect (PCI) card, a peripheral component interconnect express (PCIe) card, field programmable gate arrays (FPGA), application specific integrated circuit (ASIC), and computing cycles of a processor.

In some embodiments, steps (e.g., creating logical storage drives, mapping, compression, segmentation, aggregation, encryption, copying, data reads, data writes, etc.) of the disclosed technologies are not limited to being executed by a single processor. In some cases, two or more processors are used to execute the steps. In some embodiments, a step is executed by a first processor at a first time and by a second processor at a second time.

In some embodiments, some steps can be executed independently or in parallel.

Figure 3A:
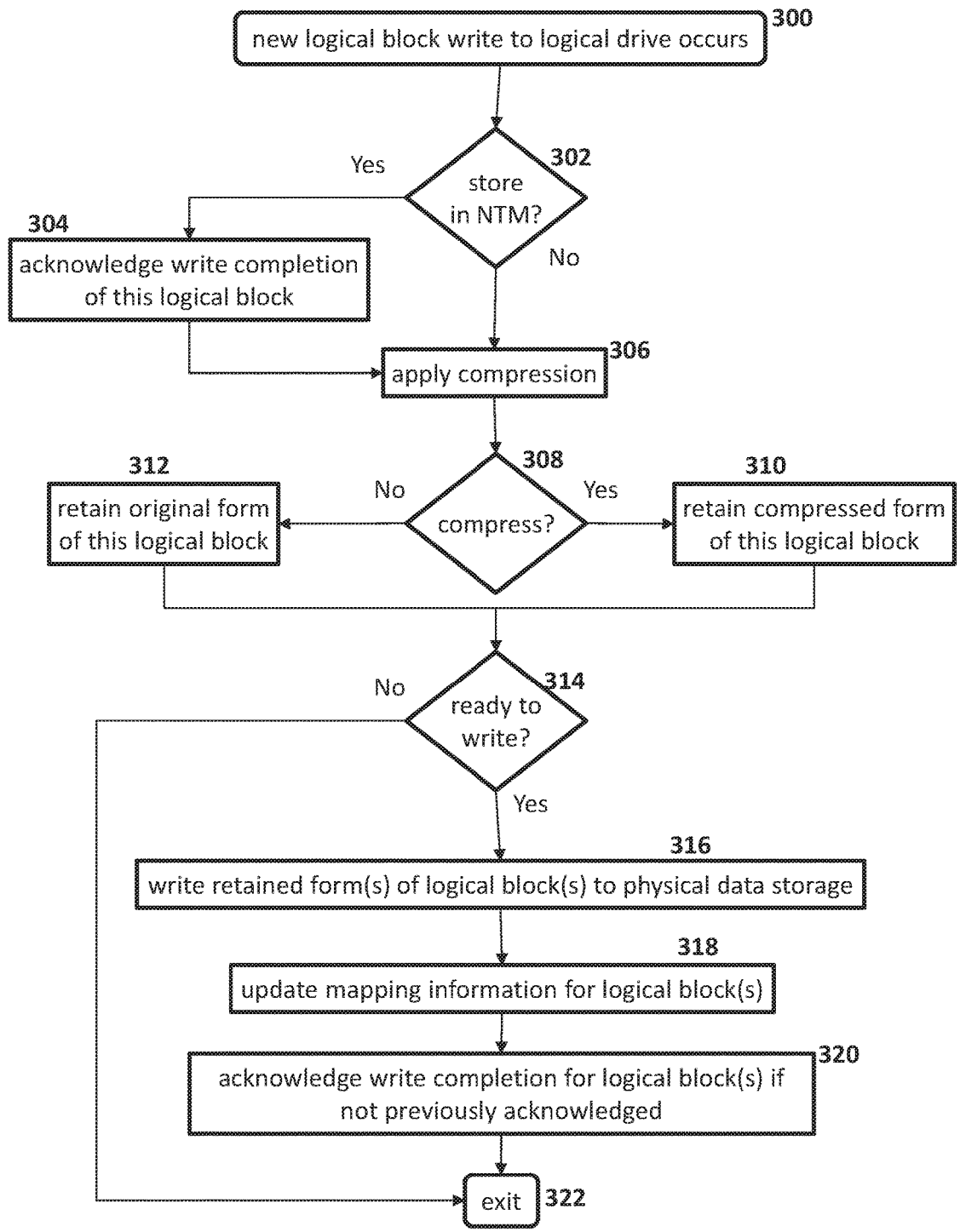
FIG. 3A shows an overview of a data write process.
Figure 3B:
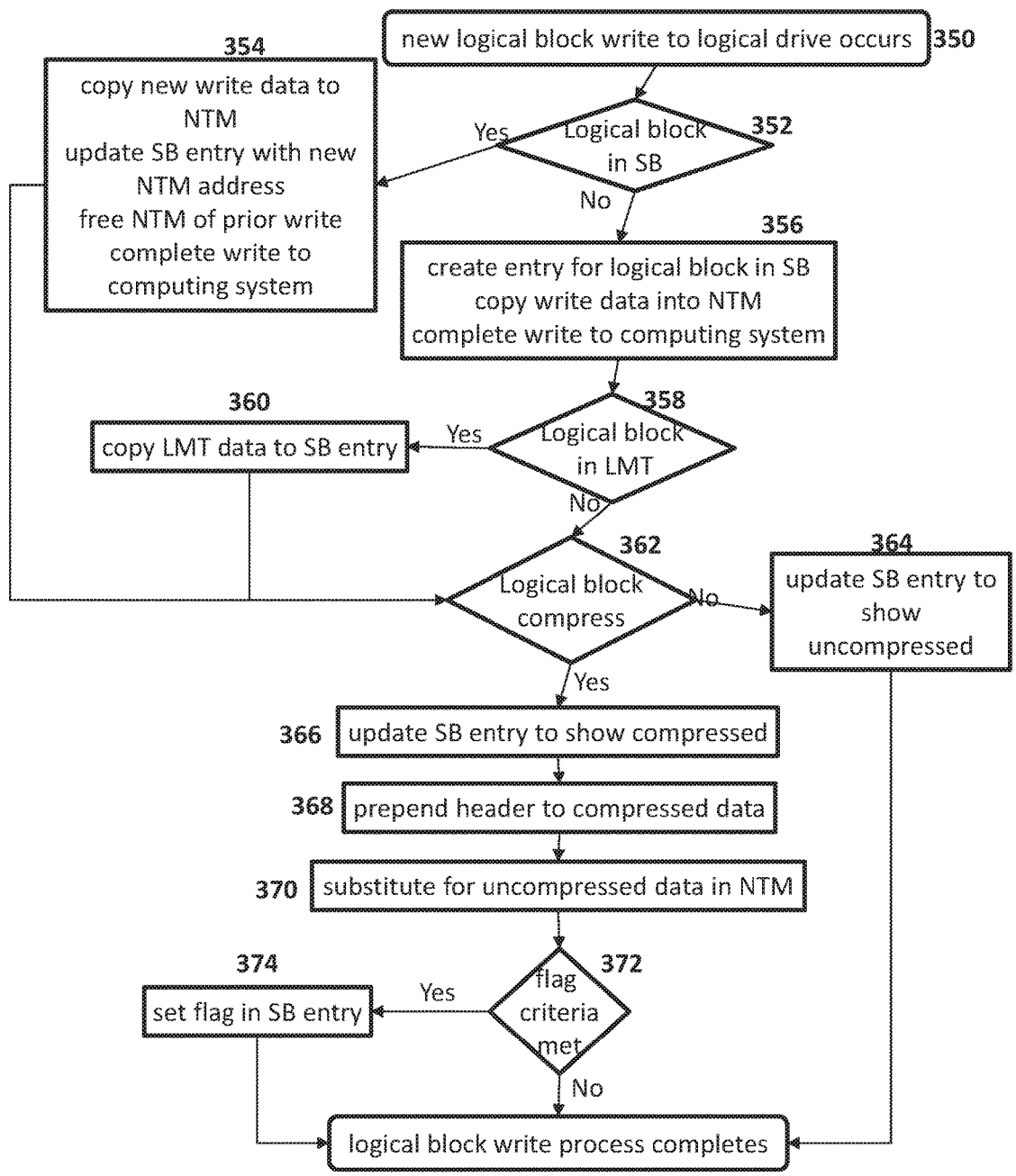
FIG. 3B shows an exemplary flowchart of a process used when a computing system writes data to logical storage drives or protected logical storage drives.

Referring to FIG. 3B, in some embodiments, reading the LMT data (358) and applying compression to the logical block (362) occur asynchronously and in parallel.

Figure 4:
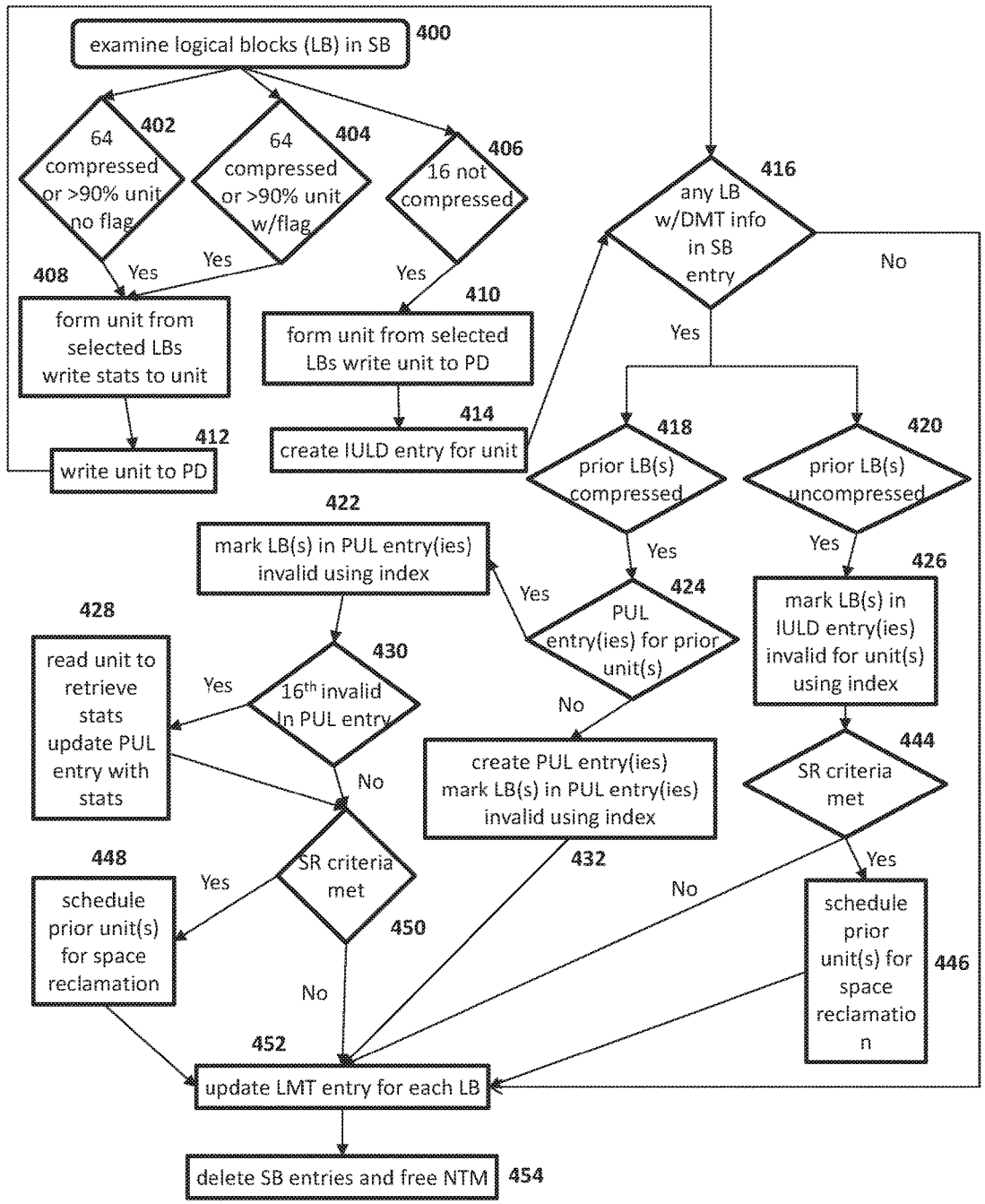
FIG. 4 shows an exemplary flowchart of process to write data to physical storage drives from logical storage drives.

Referring to FIG. 4, in some embodiments, in any given path through this flow chart, writes to physical drives (412), IULD creation (414), LMT entry update (452), statistics retrieval (428), and garbage collection (448 and 446) are run asynchronous and in parallel. In additional embodiments, there are multiple instances of this chart running in parallel, each can start anytime when the criteria in 402, 404, and 406 are satisfied.

Figure 5A:
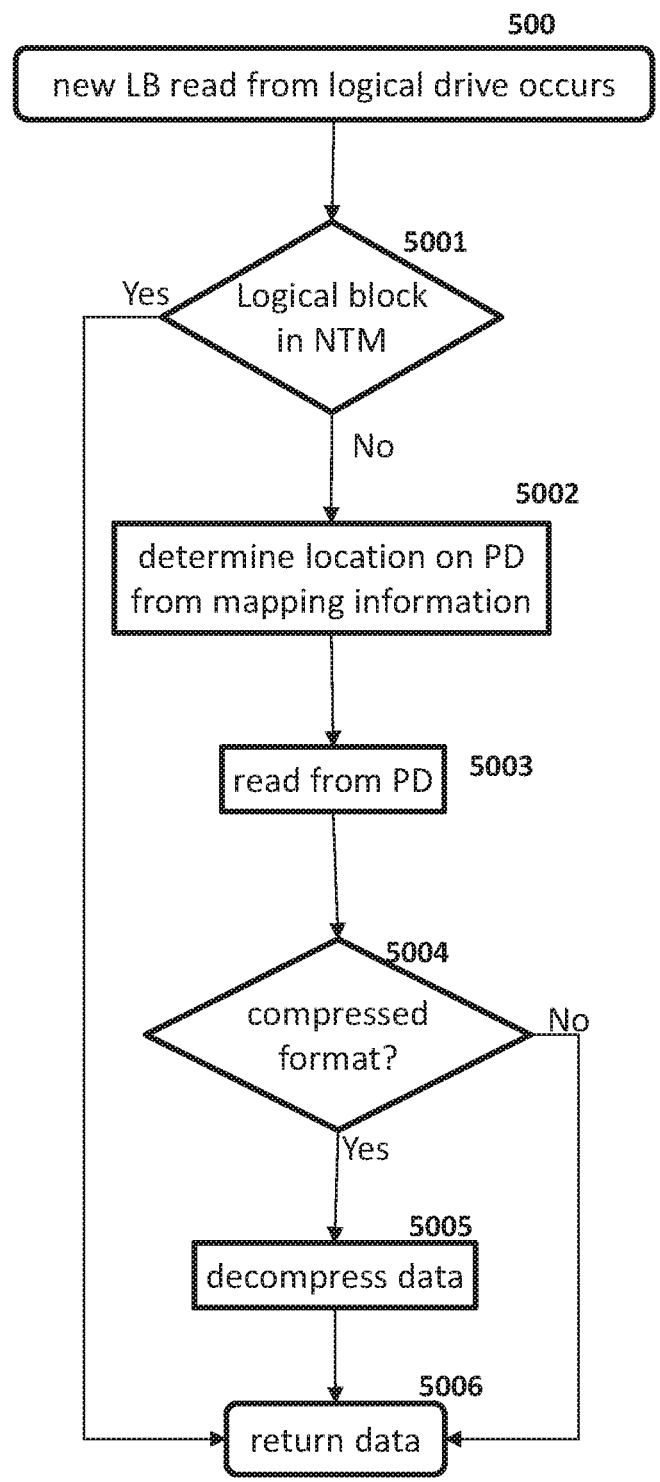
FIG. 5A shows an overview of a data read process.
Figure 5B:
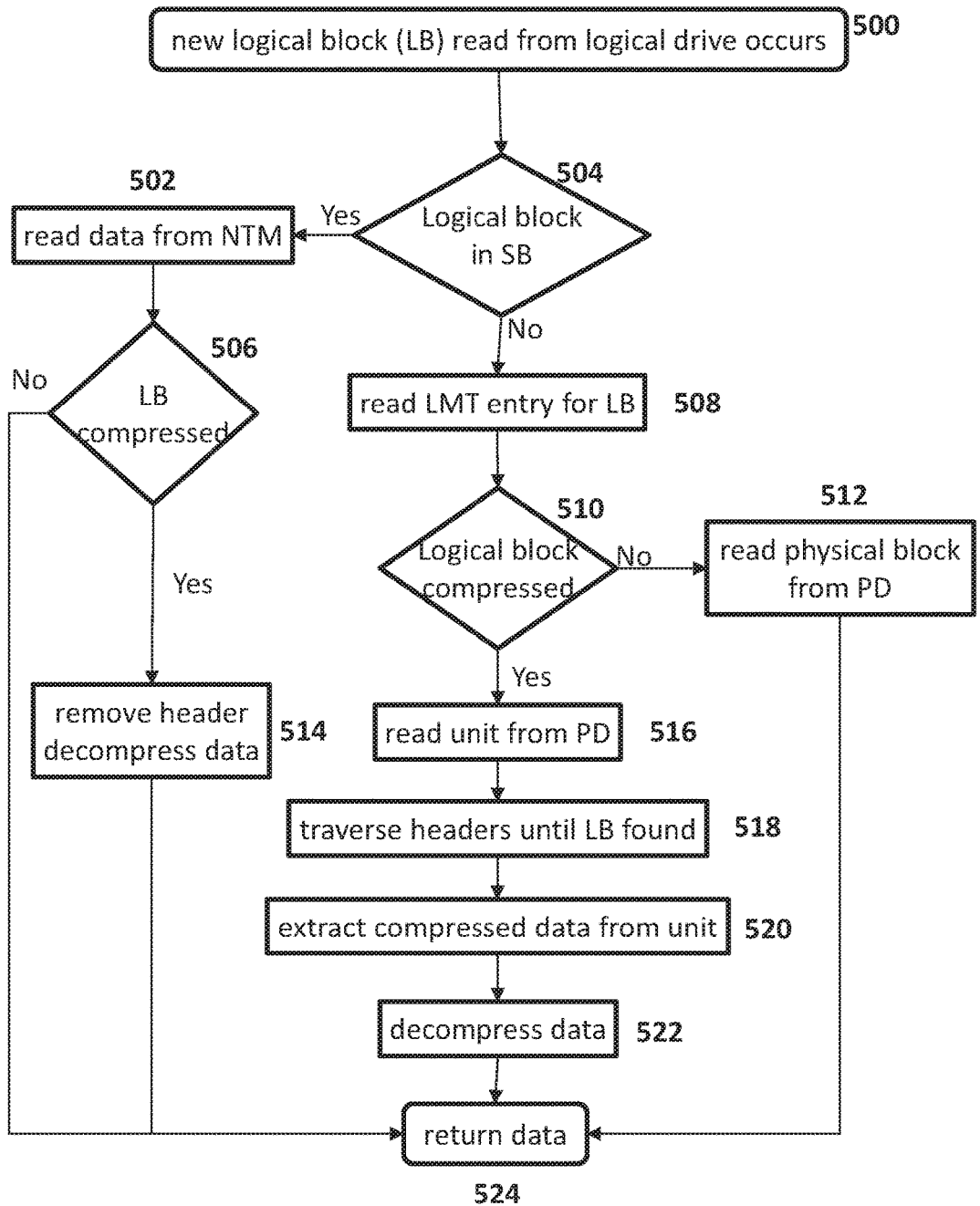
FIG. 5B shows an exemplary flowchart of a process used when a computing system reads data from logical storage drives.

Referring to FIG. 5B, in some embodiments, reading the LMT (508), decompressing data (514 and 522), and reading from the PDs (512) operates asynchronously and in parallel. In some embodiments, this flowchart runs in parallel when the computing system issues multiple outstanding reads.

Figure 6:
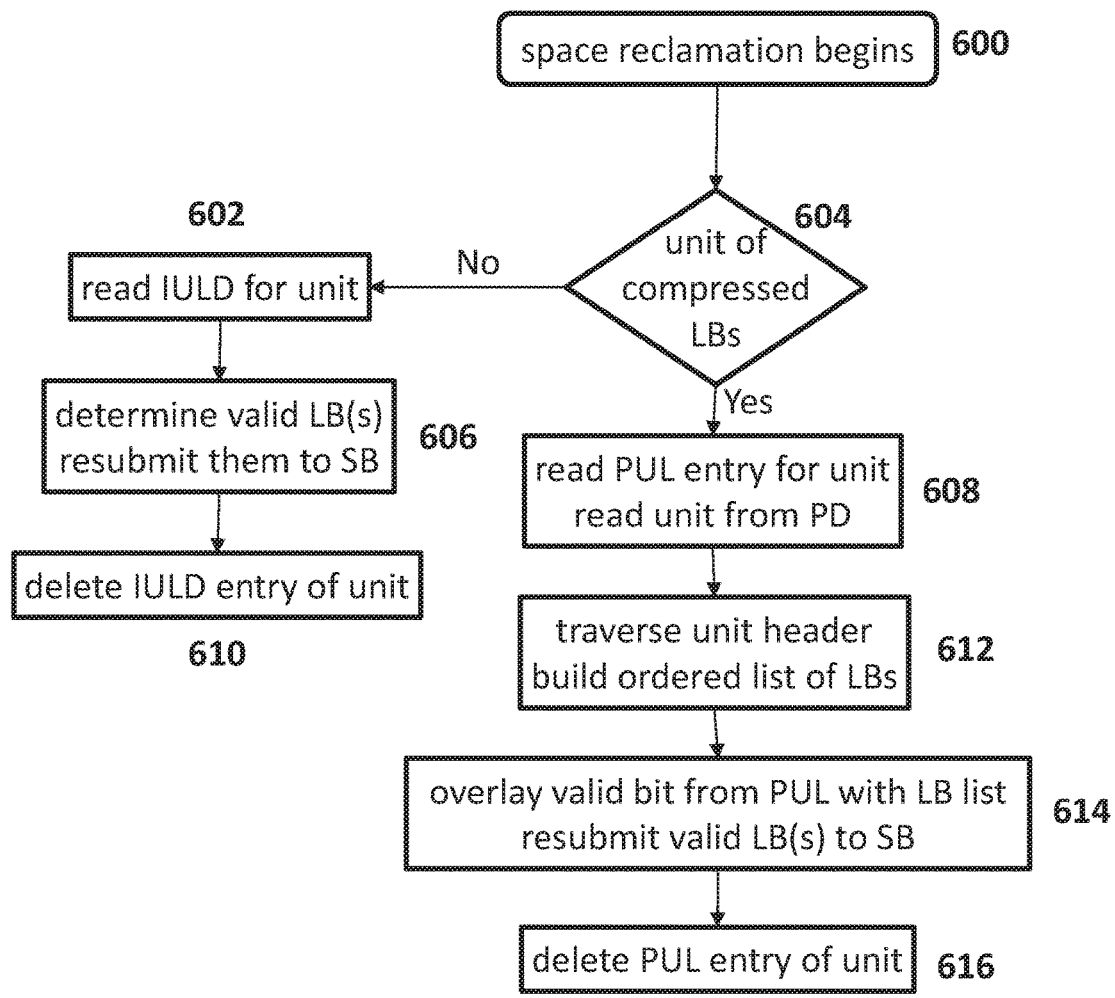
FIG. 6 shows an exemplary flowchart of a space reclamation process.

Referring to FIG. 6, in some embodiments, manipulating IULD entries (602 and 610) is asynchronous and runs in parallel. In some embodiments, this full flowchart often runs in parallel.

Figure 11:
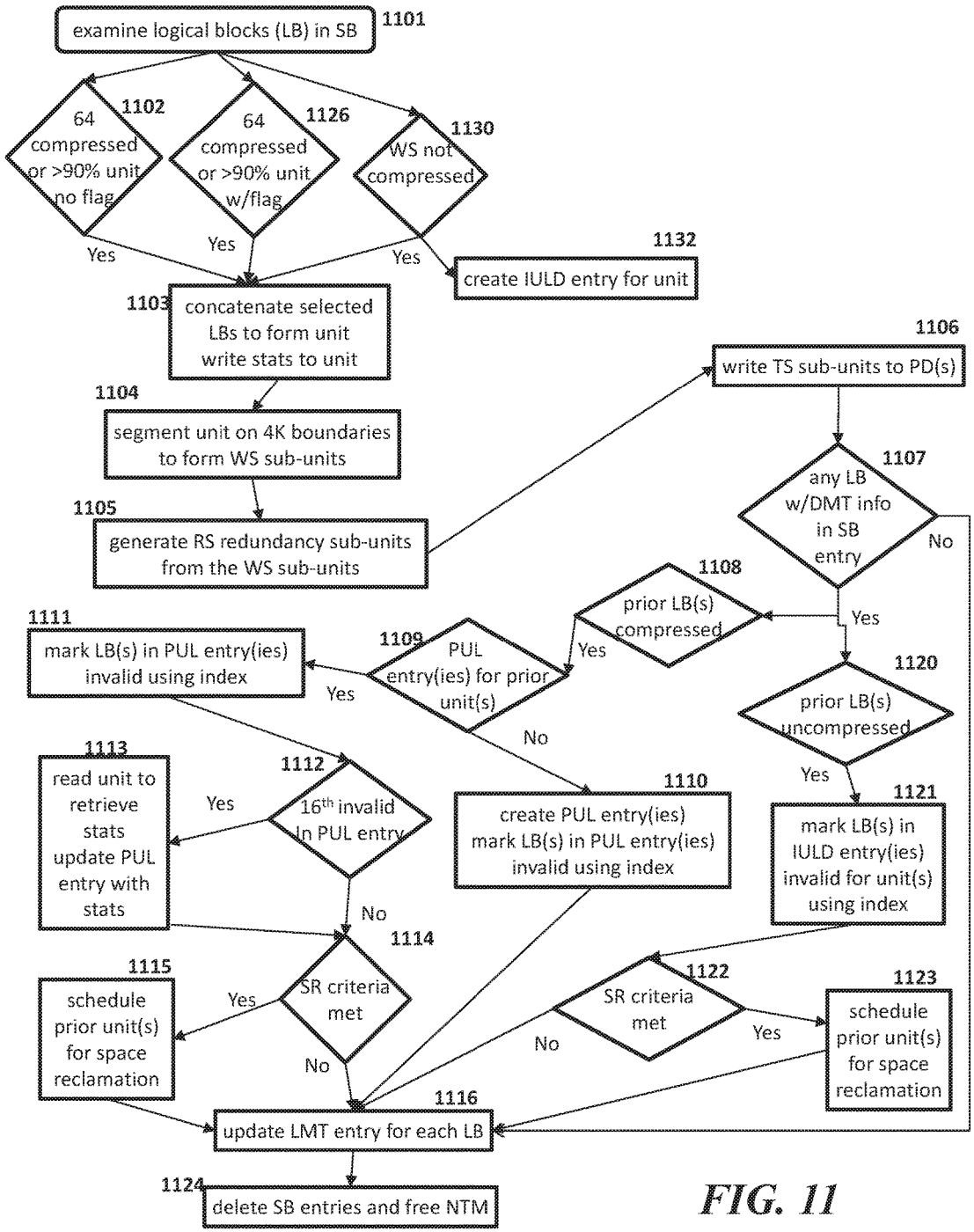
FIG. 11 shows an exemplary flowchart of a process to write data to protected logical storage drives.

Referring to FIG. 11, in some embodiments, in any given path through this flow chart, writes to physical drives (1106), IULD creation (1132), LMT entry update (1116), stats retrieval (1113), and garbage collection (1115 and 1123) are asynchronous and run in parallel. In some embodiments, concatenation (1103), segmentation (1104) and redundancy generation (1105) run asynchronously and in parallel as a set, but not independently. In some embodiments, there can be multiple instances of this chart running in parallel, each starting anytime the criteria in 1102, 1126, and 1130 are satisfied.

Figure 12:
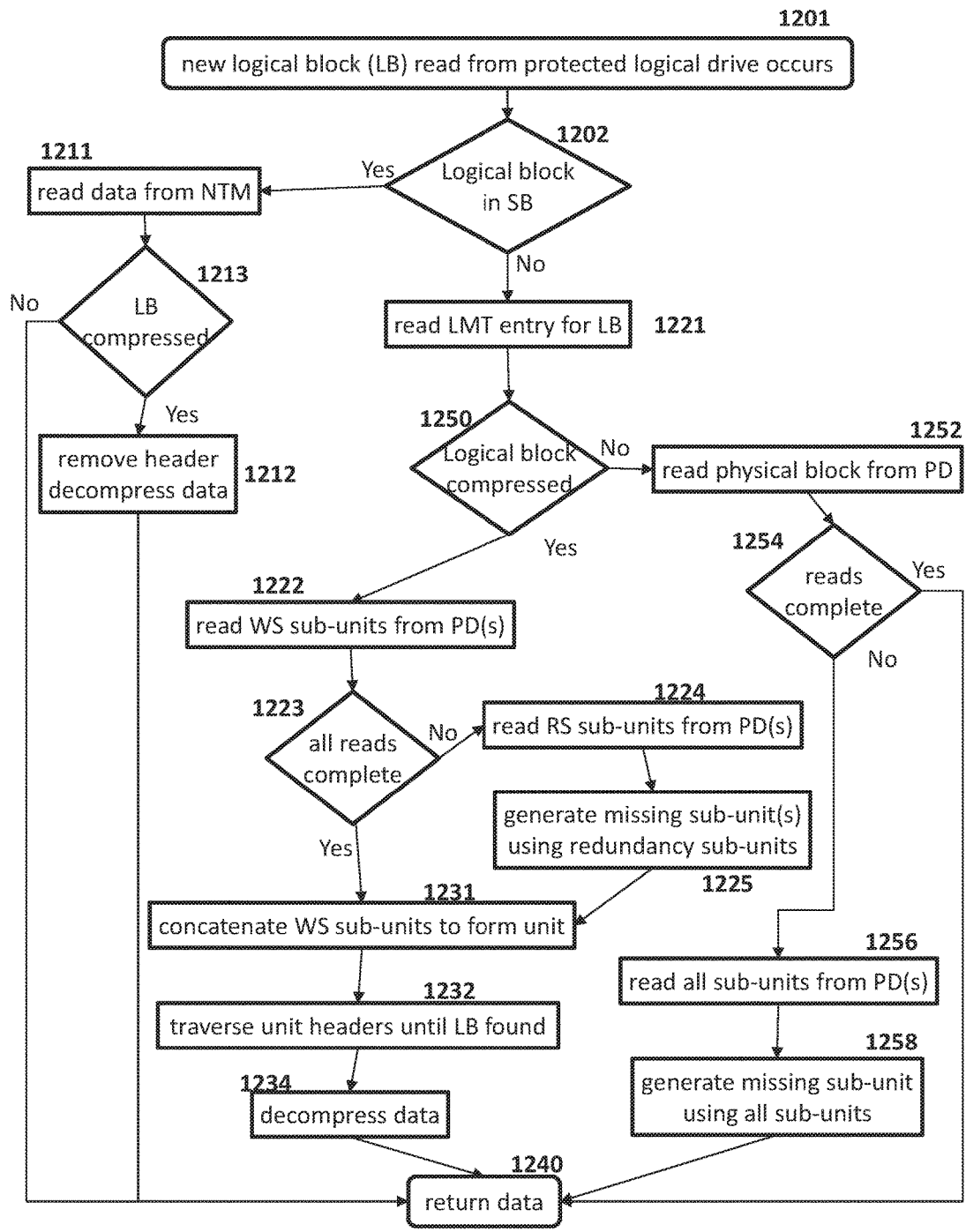
FIG. 12 shows an exemplary flowchart of a process to read data from protected logical storage drives.

Referring to FIG. 12, in some embodiments, reading the LMT (1221), decompressing data (1212 and 1234), and reading from the PDs (1222, 1224, 1256) all occur asynchronously and in parallel. In some embodiments, application of redundancy units to recover errors (1224, 1225, 1256 and 1258) also occurs asynchronously and in parallel. In some embodiments, multiple instances of this chart may occur in parallel if there are multiple outstanding reads from the computing system.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the devices, media, systems, and methods described herein and are not meant to be limiting in any way.

Example 1—Architecture

FIG. 1 shows an example diagram of a computing system connected to an example storage controller and physical storage drives. There is a computing system 10 with processors 12, memory 14, and an Input/Output (I/O) subsystem 16 allowing the computing system 10 to interface with many devices, including storage devices. In this example, the Input/Output subsystem 16 using a SAS interconnect 18 to interface with a controller 20 disclosed herein. The controller 20 has one or more processors 22, volatile memory 24, and Non-Transitory Memory (NTM) 26, and its own I/O subsystem 28.

The controller 20 also incorporates a private internal storage 30 (e.g., a solid-state drive) and additional private SAS interconnects 32 used to interface with one or more physical drives (PDs) 34.

The controller implementation shown in FIG. 1 is only one of many possibilities. Any storage interconnect technology such as SATA, Fibre Channel, or iSCSI is suitable for either the SAS interconnect 18 from the I/O subsystem 16 of the computing system 10 to the controller 20, for the SAS interconnects 32 from the controller 20 to the PDs 34, or both.

The example shown in FIG. 1 has many physical packaging options. For instance, the controller 20 is a separate element as shown in FIG. 1. In some cases, the controller 20 is implemented within the computing system 10 as a separate board or Peripheral Component Interconnect—Express (PCIe) option card. In some designs, the controller functions utilize the processor 12 and memory 14 within the computing system 10 rather than having unique controller 20 processor(s) 22 and memory 24. In some implementations, the controller 20 is packaged with the PDs 34.

Although the PDs 34 are shown as representative storage drives, any block based storage drive is suitable, e.g., optical drives, tape drives, and solid state drives.

The private internal storage 30 and NTM 26 are optional elements, which increase the performance of the controller 20 but are not required to embody the technologies disclosed herein.

Example 2—Mapping

Figure 2:
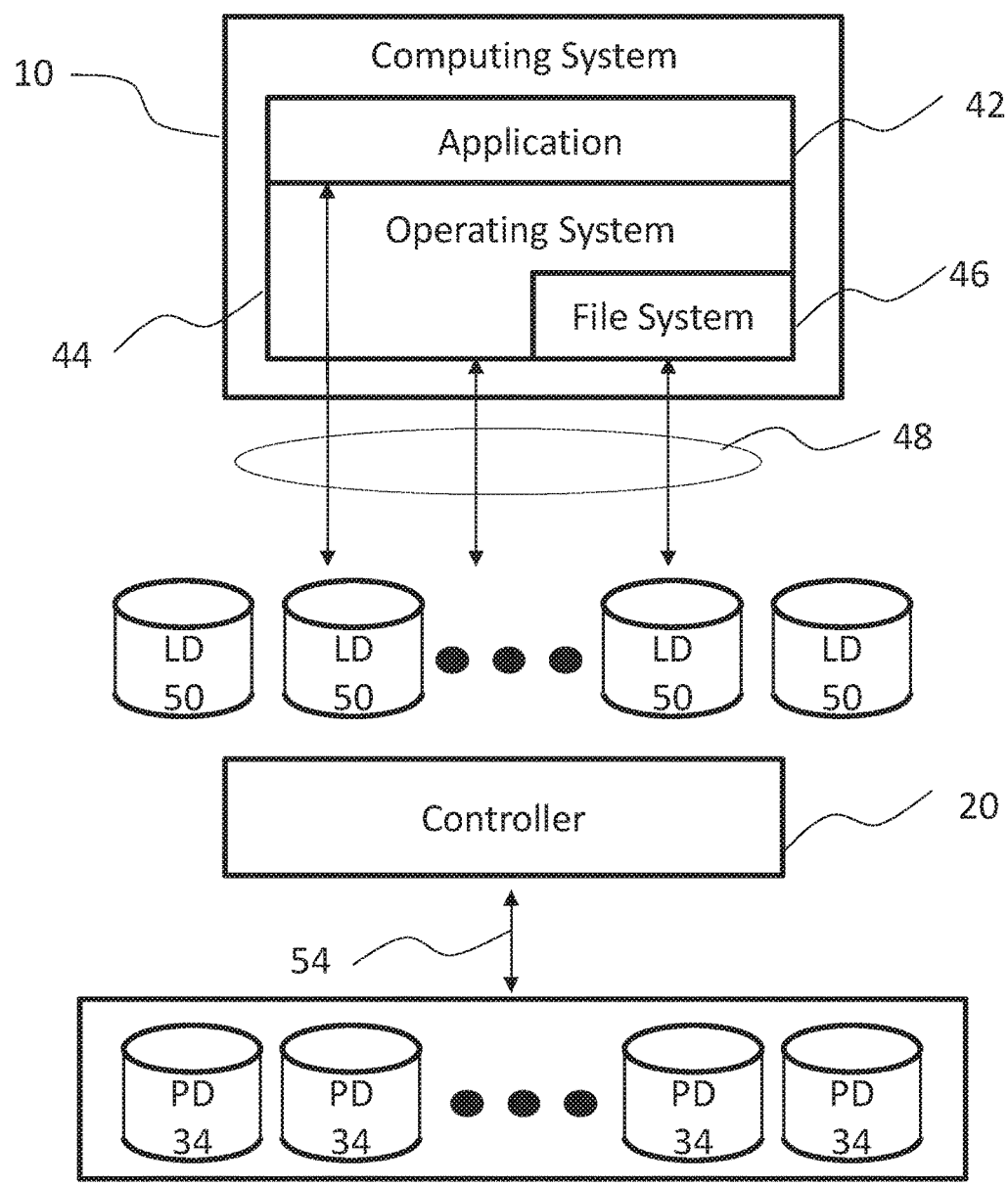
FIG. 2 shows exemplary structures of a computing system and logical storage drives created by a disclosed controller.

FIG. 2 illustrates a computing system 10, running software applications 42 on an operating system 44. The operating system 44 contains a file system 46. In some embodiments, the applications 42, operating system 44 and file system 46 all use block storage accesses 48 to utilize the logical storage drives 50.

The logical storage drives (LD) 50 are logical entities composed by the controller 20 from one or more PDs 34 which the controller 20 accesses using block storage accesses 54.

In some embodiments, logical storage drives 50 are individually identified by a unique logical unit number (e.g., 1, 2, 3, etc.).

The applications 42, operating system 44, and file system 46 cannot utilize the PDs 34 directly. The block storage accesses 48 of the applications 42, operating system 44, and file system 46 to the LDs 50 are transformed by the controller 20, resulting in a different set of block storage access 54 to the PDs 34.

Support for a large number of logical storage drives 50 is desirable. In some embodiments, a computing system can handle up to 128 logical storage drives, correspondingly up to 128 unique logical storage drives are supported by the controller 20.

The number of logical storage drives 50 composed by an instance of the controller 20 is arbitrary and defined by the needs of the computing system 10.

The size of each logical storage drive 50 composed by the controller 20 is also arbitrary and defined by the needs of the computing system 10.

Support for a large number of PDs 34 is desirable. In some embodiments, a controller supports 2, 4, 8, 16, 32, 64, 128, or 256 PDs 34. In this example, 128 PDs are considered for illustration purpose.

Physical storage blocks on the PDs 34 are allocated to each logical storage drives 50. Selection of the physical blocks for any single logical storage drive 50 from the set of PDs 34 is arbitrary. The physical storage blocks for any single logical storage drive 50 may come from a single PD 34 or be selected from multiple PDs 34 or from portions of multiple PDs 34.

In a particular embodiment, the implementation considers limiting the controller 20 to 16 PDs 34 from the potential pool of 128 PDs 34 when allocating a set of physical blocks for a single logical storage drive 50. The list of 16 potential storage drive addresses being used by a logical drive is private to each logical drive and is called the Private Drive Vector (PDV). The controller 20 maintains a structure which allows the controller to map any particular logical drive's 16 potential PDV drives to the 128 possible PDs 34.

Any 16 of the 128 PDs 34 can be selected for any specific logical storage drive 50. The relationship between logical storage drives 50 and PDs 34 is not exclusive. Multiple logical storage drives 50 can utilize physical blocks from a single PD 34.

The total size of all logical storage drives 50 composed by the controller 20 can exceed the total size of all PDs 34 in certain circumstances determined by the data entropy and configuration choices made by the administrator of the computing system 10.

The operation of the controller 20 is logical drive centric. Every process, structure, etc. described for the remainder of the document is replicated for each logical drive and exists and operates independently.

Example 3—First Time Write: Overview

FIG. 3A shows an overview of a data write process. As in 300, a computing system requests to write data to a logical block within the logical drive. When the controller receives the write request, its operation 302 decides wheter or not to store data in a NTM. If there is a NTM present and if the NTM has available space, the operation 302 takes the "Yes" path; the step 304 acknowledges write completion of the logical block, followed by applying a compression algorithm 306. At the check 302, if there is no NTM or the NTM is full, the controller takes the "No" path, where the controller directly applies a compression algorithm 306.

In some cases, the controller performs a check 308 to determine if the data has been compressed. If compressed, the operation 310 retains the compressed form of this logical block; otherwise, the operation 312 retains the original form of this logical block.

In some cases, a check 314 is made to determine if the controller is ready to write the data. The condition of readiness is multivariate; for instance, by way of non-limiting examples, the physical drive is not operating other writes/reads, a power level is sufficient, the data write has priority at this time versus other processes such as space reclaimation or a data read, etc. If ready, the operation 316 writes the retained form of the logical block to one or more physical storage drive, followed by the operation 318 of updating mapping information for the logical block. When the data write request was not previously acknowledged, the controller may further perform acknowledgement 320 of write completion for the logical block. The final step 322 is that the data process exits.

In some cases, the check 314 finds that the controller is not ready to write the data. In some embodiments, the retained form of this logical block is held by the controller until the next time the 314 check occurs again and passes; at that time, all logical blocks previously retained by the controller go through steps 316, 318, and 320.

Example 4—First Time Write: Details

FIG. 3B shows an example flowchart of a detailed process used when a computing system writes data to a logical storage drive. As in 350, within a specific logical drive, the computing system may write any logical block at any time.

As in 352, when a block write that is requested from the computing system to a specific logical block within the logical drive arrives at the controller, the controller first checks to see if there is an entry for the logical block in a tracking structure called the Score Board (SB), which is used by the controller to track writes that are being processed and have not yet been written to PDs.

As this is the first time this specific logical block is being written by the computing system, this SB test will be false.

The controller copies the new write data into non-transitory media, adds information about the logical block and its location within the non-transitory media to the SB, then acknowledges completion of the write to the computing system as shown in 356.

As shown in 358, the controller also checks for an entry for the logical block in another tracking structure called the Logical Drive Mapping Table (LMT), whose function is described herein.

If an entry for the logical block is found in the LMT, the contents of the LMT entry are added to the SB entry for the logical block. Since this is the first time that this specific logical block is being written by the computing system, there will be no entry for the logical block in the LMT.

As in 362, the controller attempts to compress the new write data.

If the new write data compresses, the SB entry for the logical block is updated to show it as compressed as shown in 366.

As in 368, a header showing logical block number and compressed length is created and prepended to the compressed write data.

The compressed write data with prepended header then replaces the initial uncompressed write data in NTM as shown in 370.

As shown in 374, certain compressible writes may have an additional flag set in their logical block's SB entry indicating they are more likely to be updated in the future than other compressible writes. Once this bit is set for a logical block, it will persist through time, even if future writes to the logical block do not meet the criteria which were initially used to set the flag.

In some embodiments, the controller makes use of logical block address within the logical drive and/or the size of the compressed write data to determine if the additional flag described should be set. The specific parameters of both values depend on the size of the logical drive and the configuration choices made by the administrator of the computing system.

As described in the pervious two paragraphs, the controller detects data writes that are more likely to be rewritten in the future than other data writes. In some applications, the data of these writes is meta data belonging to software elements of the computing system (e.g., file system, operating system, application, etc.). In some cases, the data of these writes belongs to a user. In some embodiments, the writes are segregated and only form data units with other similar writes. The detection of these writes is made by examining the logical block address within the logical drive, the entropy level of the data held in the logical block (e.g., denoting how much it compresses), or both. The specific parameters of address and entropy vary based on the choices made by the administrator of the computing system. Non-limiting examples of the parameters include: a size of the logical drive, a type of operating system used on a commuting system, a type of file system used on a computing system, etc. A benefit of the detection is to reduce the back end workload of space reclamation, whose details are described below.

In some embodiments, compressed write data is smaller than a physical block within the PDs, so data from multiple compressed writes will be aggregated into a data unit before being written to the PD(s).

Some embodiments use 64K bytes as the fixed size of all data units and allow the data from no more than 64 compressed writes to be stored within any single data unit. Some other embodiments use data units of a different fixed size or data units of varying size. A condition is that the data unit size is equal to or greater than the size of a physical block. In some embodiments, it is allowed to have the data from more or fewer compressed writes per individual data unit.

In some embodiments, a compressed write may remain on the SB and in NTM indefinitely as the process to aggregate a group of compressed writes into a data unit occurs separately and asynchronously.

Figure 7:
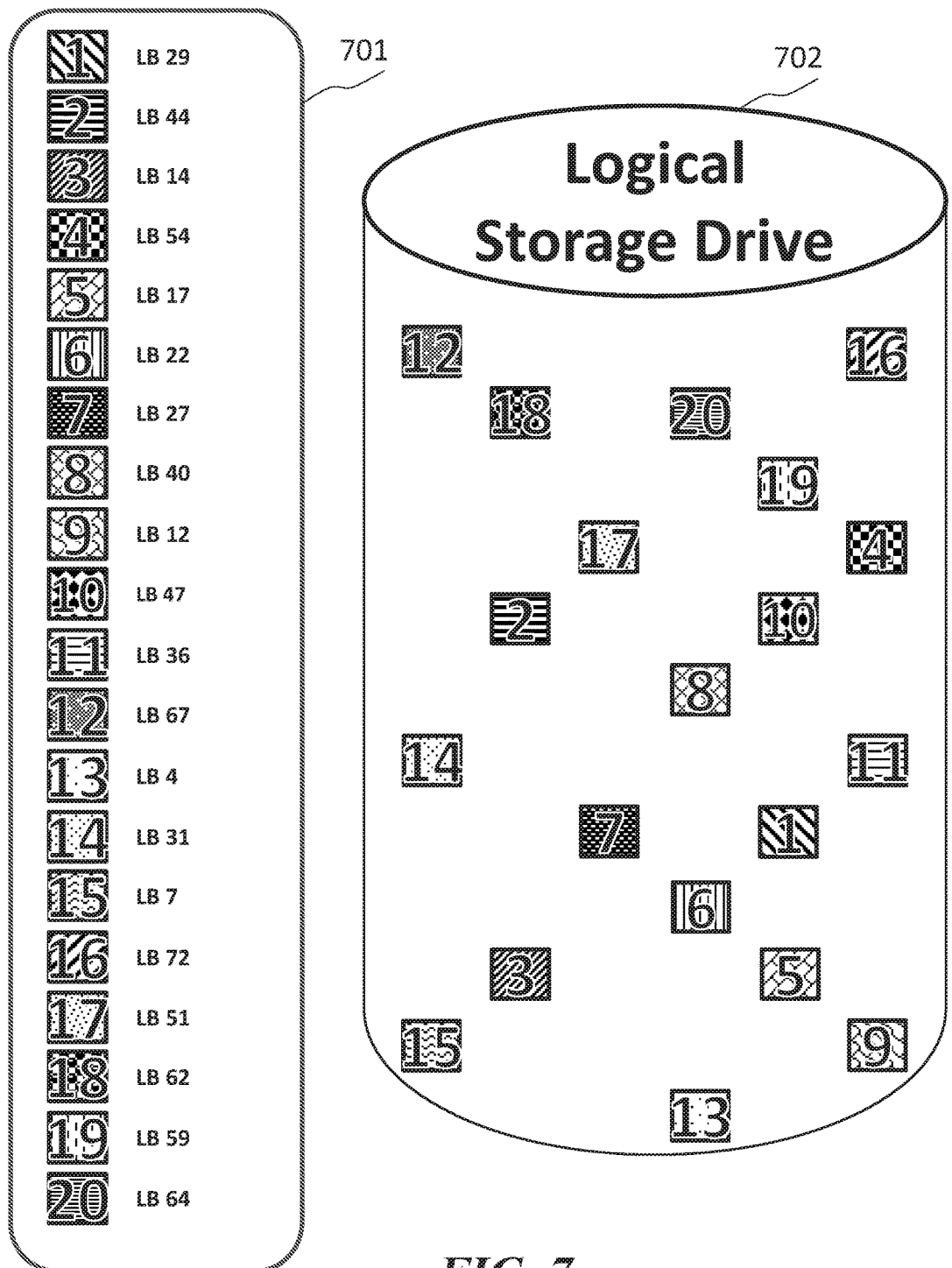
FIG. 7 shows an exemplary group of 20 writes at random logical block addresses within a logical storage drive.

Referring to FIG. 7, a set 701 of 20 writes is being processed by the computing system to a logical drive, made in numerical order. The writes were to random logical blocks and each has unique data.

The computing system view of the writes and their locations within the logical storage drive are shown on the right side 702 of FIG. 7.

FIG. 4 shows an example flowchart of a process to write data to physical storage drives from logical storage drives. As shown in 402, at some point in time, the controller has within its NTM either 64 compressed writes or a group of compressed writes whose compressed data with prepended headers is large enough to fill a data unit to greater than 90%, 80%, 70%, 60%, or 50% of its capacity.

The controller forms a data unit from this group of compressed writes with prepended headers and records: number of writes contained within the data unit, average compressed size of the writes, and the standard deviation of the sizes within the last few bytes of the data unit as shown in 408.

The controller then writes the data unit to convenient free physical blocks within the PDs as shown in 412 from the set of physical blocks within the PDs which were allocated to this logical drive when it was created.

Figure 8:
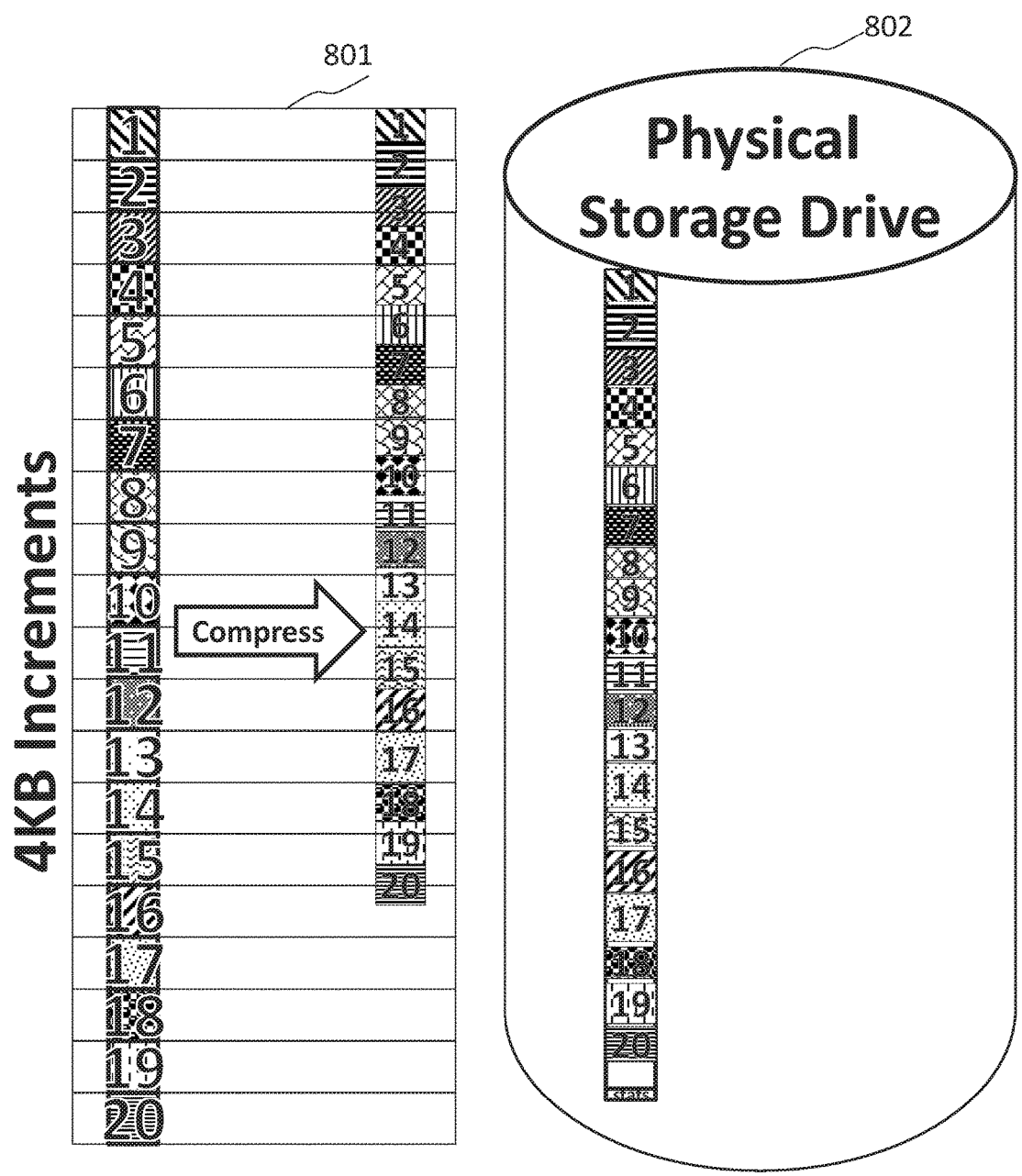
FIG. 8 shows exemplary writes forming a data unit and as written to a physical storage drive from a logical storage drive.

Referring to FIG. 8, the controller receives the 20 writes 701 of FIG. 7, compressing each as they arrive. The process 801 of FIG. 8 also shows that after the write of number 20, the controller has enough compressed writes that their compressed data is large enough to fill a data unit to greater than 90% of its capacity.

The physical storage drive 802 of FIG. 8 shows the data unit containing the twenty compressed logical blocks written to a PD. The stored data in the physical storage drive is clearly very different from the logical storage drive view of these writes the controller has created for the computing system as shown on the logical storage drive 702 of FIG. 7.

Referring again to FIG. 4, for each compressed write contained within the data unit, the controller then creates an entry for its logical block in the LMT, as shown in 452. The LMT is indexed by logical block number and each entry within the LMT contains: the PDV of the PD the data unit containing the compressed write was written to, the physical block address within the PD, an index within the data unit from 1 to 64, the value of the additional bit, and a bit showing that the write was compressed.

This example stores the LMT on a solid-state drive, but other examples can choose to keep the LMT in other NTM.

As shown in 454, once the data unit has been written to a PD and the LMT entries for all of the logical blocks within the data unit have been created, the SB entries for the logical blocks are deleted and the NTM occupied by the compressed write data with prepended headers is freed.

Compressed writes with the additional flag set are not to be combined in data units with compressed writes that do not have the additional flag set, so the process is performed separately for compressed writes within the SB both with and without the flag set as shown in 404.

If the attempt to compress the new write data fails, the uncompressed write data is maintained in NTM and the SB entry for the logical block is updated to show it as uncompressed as shown in 364.

An uncompressed write may remain on the SB and in NTM indefinitely as the process to aggregate a group of uncompressed writes into a data unit occurs separately and asynchronously.

At some point in time, the controller will have a group of uncompressed writes within the NTM large enough to completely fill a data unit as shown in 406. This requires multiple (e.g., 2, 4, 8, 16, or 32) uncompressed writes in this embodiment.

As shown in 410, the controller forms a data unit from this group of uncompressed writes and then writes the data unit to convenient free physical blocks within the PDs from the set of physical blocks within the PDs which were allocated to this logical drive when it was created.

For each uncompressed write contained within the data unit, the controller then creates an entry in the LMT containing: the PDV of the PD the data unit containing the uncompressed write was written to, the physical block address within the PD, an index within the unit from 1 to 16, and a bit showing that the write was uncompressed as shown in 452.

The 16 uncompressed writes fill a data unit completely leaving no room for headers or other descriptive information about the uncompressed writes within the data unit, so the controller creates a separate structure known as the Incompressible Unit Logical Block Descriptor (IULD) to track this information as shown in 414.

IULD entries are indexed by physical block number for each physical drive and contain an ordered list of the 16 logical blocks within the data unit and 16 valid bits, whose use is described herein, when rewrites are discussed.

This example stores the IULD entries on the PDs, but many other options are possible including storing the IULD entries in NTM or on a SSD.

Once the data unit has been written to the PDs, the LMT entries for all of the logical blocks within the data unit have been created, and the IULD entry for the data unit has been written, the SB entries for the logical blocks are deleted and the NTM occupied by the uncompressed write data is freed as shown in 454.

Example 5—Read: Overview

FIG. 5A shows an example flowchart of a process used when a computing system reads data from logical storage drives. Within a specific logical drive, the computing system may read any logical block at any time as shown in 500.

A first step 5001 is to check if the requested logical block is currently being processed and is currently stored in NTM. If the data is stored in the NTM, the copy in NTM will be returned to the computing system read request 5006.

When the data is not stored in the NTM, the operation 5002 determines the location of the requested data on the physical storage drives based on the mapping information. Once the location is identified, the operation 5003 reads the requested data from the physical storage drives.

Next, a check 5004 is performed to determine if the requested data is in a compressed format. If the data is in a compressed form, the controller applies a decompression algorithm 5005 to the data, followed by the return 5006 of the requested data to the computing system. If the data is not in a compressed form, the controller can directly make the return 5006 of the requested data to the computing system.

Example 6—Read: Details

FIG. 5B shows an example flowchart of a process used when a computing system reads data from logical storage drives. Within a specific logical drive, the computing system may read any logical block at any time as shown in 500.

As shown in 504, the controller first checks the SB entries to determine if the requested logical block is currently being processed.

If the SB check determines that the requested logical block is being processed and thus is currently stored in NTM, the copy in NTM will be used to satisfy the computing system read request, as shown in 502.

If the SB entry for the requested logical block is flagged as incompressible, the data from the NTM buffer is returned to the computing system directly as shown in 524. No change is made to the SB entry or NTM.

If the SB entry for the requested logical block is flagged as compressible, the prepended header is removed and the resulting payload is decompressed as shown in 514 and returned to the computing system as shown in 524. No change is made to the SB entry or NTM.

As shown in 508, if the SB check determines that the logical block is not currently being processed, the controller reads the LMT entry for the requested logical block to determine: PDV, physical block address, index within the data unit, and the compressible bit.

The controller maps the PDV value from the logical block's LMT entry to a PD using configuration information determined when the logical drive was created.

If the LMT entry read shows the logical block was compressed, the controller reads the complete data unit into volatile memory using the physical block address from the LMT and the PD information, as shown in 516.

All data units begin with the header that was prepended to the first compressed write that was stored within the data unit.

Every header within the data unit, including the initial header, provides the logical block address and length of the compressed write which follows it.

The length information within each header can be used to find the offset to the next header within the data unit, effectively allowing the controller to traverse the headers within a data unit.

The controller traverses the headers within the data unit read using the physical block address from the LMT and PD information until it finds the header containing the requested logical block address.

The length field from this matching header is used to extract the compressed write data from the data unit as shown in 520.

The extracted compressed write data is decompressed as shown in 522 and returned to the computing system as shown in 524.

In some embodiments, the data unit is optionally discarded or optionally retained in memory if the controller predicts that additional computing system reads from the data unit are likely.

If the LMT entry check shows the logical block was uncompressed, the controller can determine the exact physical block which contains the requested data out of the 16 physical blocks comprising the data unit and can retrieve the data needed to satisfy the computing system read request by reading this single physical block rather than the complete data unit.

The PDV value from the LMT entry for this logical block has already been mapped to a PD. This PD location can be used with the physical block address and index within the data unit to determine the exact physical block location, which is read from the PD as shown in 512 and whose data is returned to the computing system, shown in 524.

Example 7—Rewriting a Logical Block

A process of rewriting a logical block while processing an earlier write to the same logical block is as follows. When a new write occurs, in this instance, the SB test finds an existing entry for the logical block in the SB. This means the logical block was written recently enough that the earlier write is still being processed by the controller and has not yet become part of a data unit and been written to PDs. Referring again to FIG. 3B, the controller copies the new write data into NTM, updates the SB entry for the logical block to point to the NTM location of the new write data, frees the NTM being used by the older version, and completes the write to the computing system as shown in 354. Write processing then continues as the new write data may be compressible when the prior version that was found in the SB was not, or vice-versa.

A process of rewriting a logical block that was previously written to PDs is as follows. A new write occurs, but in this instance, the LMT test finds an existing entry for the logical block in the LMT. The controller appends the information from the LMT entry to the SB entry for the logical block as shown in 360, including: PDV, physical block address, index within the data unit, if the logical block was compressed, and in some cases, the additional bit.

The existence of an entry for the logical block in the LMT means that a prior write to this logical block became part of a data unit and was written to the PDs at some time in the past.

Referring again to FIG. 4, if the existing LMT entry shows that the prior version of the logical block was compressed as shown in 418, the controller performs the normal process described above for compressible first time writes, but must perform some additional steps, which are described herein.

As shown in 424, the controller checks a tracking structure call the Partial Unit List (PUL) to see if an entry for the physical block address from the existing LMT entry for the logical block is found.

Each entry within the PUL contains: the number of compressed writes within the data unit (if known), average size of these writes (if known), standard deviation of the sizes (if known), and 64 bits used to show which of the 64 potential compressed writes within the data unit have been rewritten, and are thus invalid.

If this is the first time a compressed write within this particular data unit on the PD has been rewritten, a PUL entry will not exist and the controller must create one as shown in 432 and use the index within the unit information from the existing LMT entry to set one of the 64 bits in the PUL entry as invalid.

As shown in 422, if a compressed write within the data unit was rewritten previously, the PUL lookup will find an entry for the physical block and the controller only needs to mark the correct additional bit for this logical block within the existing PUL entry as invalid as determined by the index within the data unit field found in the existing LMT entry of the logical block.

If the examination of the existing LMT entry shows that the prior version of the logical block was not compressed as shown in 420, the controller follows the process described for incompressible first time writes, but performs some additional steps.

The controller created an entry in the IULD tracking structure for each data unit containing only incompressible writes at the time these units are written to a PD.

Each IULD entry was defined to contain 16 valid bits, so when a rewrite of a logical block stored within a data unit occurs, the controller, as shown in 426, marks the correct bit within the IULD entry as invalid based on the index within the data unit field found in the existing LMT entry of the logical block.

The processes for rewriting a logical block are summarized below. The process for rewriting a logical block that is being processed by the controller is orthogonal to the process of rewriting a logical block that was previously written to a PD. The logical block of a new write may or may not have an earlier write being processed by the controller. This same logical block also may or may not have an even earlier write that the controller completed processing and wrote to a PD at some time in the past.

Example 8—Space Reclamation

As PUL entries for previously compressed writes or IULD entries for previously uncompressed writes are being updated, the controller may discover that enough of the data unit has been rewritten to justify processing the data unit to reclaim the vacant space.

Referring again to FIG. 4, when the controller is updating an existing PUL entry and finds 15 existing invalid bits, the controller reads the last physical block of the data unit to retrieve the statistics and adds them to the PUL entry for the data unit as shown in 428.

As shown in 450, on this or any future PUL update, the data unit statistics and number of invalid bits are used by the controller to determine if the data unit should be processed to reclaim free space. The specific parameters of this determination are adjustable in our embodiment.

Referring to FIG. 6, to reclaim a data unit containing compressed writes, the controller reads the complete data unit along with the PUL entry for the data unit as shown in 608.

As shown in 612, the controller scans through the data unit using the length field within the header prepended to each instance of compressed write data to find the next header within the data unit until it has read every header within the data unit. The number of valid headers within the data unit is known from the statistics written to the last few bytes of the data unit.

The ordered list of headers containing logical block address and length information is overlaid with the 64 valid bits from the PUL and all instances of compressed write data with prepended header, which are not marked invalid, are resubmitted to the SB as shown in 614.

The resubmitted compressed write data with prepended headers will be used along with other compressed writes with prepended headers being managed by the SB to form new data units and be written to a PD by the controller.

Once the valid compressed write data is resubmitted to the SB, the controller deletes the PUL entry for the data unit as shown in 616.

Referring again to FIG. 4, when the controller is updating an existing IULD entry and finds a certain number of existing invalid bits, the data unit is processed to reclaim vacant space as shown in 444. This parameter is adjustable in various embodiments, but defaults to 7.

Referring again to FIG. 6, as shown in 606, the IULD entry identifies which of the 16 uncompressed writes within the data unit are still valid. The controller reads each PD block containing valid uncompressed write data and resubmits the data and the logical block address information for each to the SB. The controller will later place this write data into new data units and write those data units to the PDs.

Once the valid uncompressed write data is resubmitted to the SB, the controller deletes the IULD entry for the data unit as shown in 610.

Example 9—Space Reclamation Optimization

Some storage drives support priority queues allowing individual operations to be placed at a higher or lower priority than others.

The controller can use this priority queue capability if present within the physical drives to put I/O operations associated with space reclamation at a higher or lower priority than I/O operations to the physical drives associated with computing system reads or new computing system writes, as determined by the urgency to reclaim capacity at any given time.

A physical drive could be enhanced so that its embedded firmware understands and can traverse the controller's data unit headers. Controller specific commands could be created allowing the controller to direct the physical drives to take specific actions for the controller.

The enhancements allow the controller to explicitly direct the physical drive to combine a specific set of logical blocks from one or more data units within the physical drive into one or more new data units and to store these new data units at specific locations. This allows the controller to reclaim space within a physical drive without ever having to transfer the data into and then out of the controller.

If the file system within the computing system supports the ATA TRIM command or the SCSI UNMAP command, it is beneficial as the controller can then reclaim the logical blocks that the file system is no longer using without waiting for the logical blocks to be overwritten later when the file system needs to use them again.

Example 10—Data Hazards

When write data is resubmitted as part of the space reclamation process, the SB must verify that an entry for the logical block is not already present before accepting the resubmitted data.

This condition can exist when a logical block has been rewritten and is being processed by the controller at the time the earlier version of the block is resubmitted.

Additionally, since the controller may have many threads or processes running on its processor(s), mechanisms must be implemented to protect all data structures shared across threads or processors to ensure no data hazards exist.

Example 11—Redundancy and Data Protection

A logical drive which is intended to have data protection is a Protected Logical Drive.

When a protected logical drive is created, the physical blocks for the protected logical drive are selected across a set of Failure Domains (FDs) within the set of storage drives in a manner that ensures there are an equal number of physical blocks within each FD.

The total number of FDs in the set and the number of failures that can be corrected are arbitrary. For convenience, the total number of FDs in the set will be called the Total Set (TS). The number of failures that should be corrected will be called the Redundancy Set (RS). TS minus RS will be called the Working Set (WS). TS, WS, and RS must be integer values.

There is no requirement that multiple storage drives be used when allocating physical blocks for the protected logical drive. If multiple failure domains exist within a single storage drive, the controller may allocate multiple or the entire equal sized physical block groups across the failure domains within the storage drive as an alternative to allocating them across storage drives.

As our embodiment primarily deals with hard drives, most computing system operators configure protected logical drives so that each FD is on a separate PD.

The controller creates a tracking structure for each protected logical drive which divides the logical block address range of the protected logical drive into regions (if needed) and then lists PD(s) providing the physical blocks used to map the logical blocks within each range. Each segment mapping entry may optionally provide a fixed offset, which can be applied to a physical block address if that address falls within the range of that segment mapping entry's region. This tracking structure is analogous to the PDV to PD mapping table created for normal logical drives.

When a write arrives at the controller for a protected logical drive, it is committed to NTM. Then, the controller examines logical block(s) in the SB and updates. A LMT read occurs. Next, the controller acknowledges the completion of the write to the computing system in a process identical to that described earlier for a logical drive.

The controller attempts to compress the new write data and replaces the uncompressed write data in non-transitory media if the write does compress. However, the controller leaves the uncompressed write data in non-transitory media if the data is not compressible or does not need to be compressed.

If the new write data compresses, a header containing the logical block address and length is prepended to compressed form write in non-transitory media.

This example considers the data unit size for a protected logical drive as 64 KB for illustration purpose; however, other embodiments based on other size (e.g., 8 KB, 16 KB, 64 KB, 128 KB, 256 KB etc.) can be realized. In practice, the data unit size will be 4 KB times WS, so WS is assumed to be 16 for this example.

This example considers no more than 64 writes to be combined into a data unit. Other embodiments may consider no more than other number (e.g., 128, 32, 16, 8, 4, etc.) of writes.

At some point in time, the controller will have within its non-transitory media either 64 compressed writes without the additional bit set or a group of compressed writes without the additional bit set whose data with prepended headers is large enough to fill a data unit to greater than 90%, 80%, 70%, 60% or 50% of its capacity.

The controller may also find within its non-transitory media either 64 compressed writes with the additional bit set of a group of compressed writes with optional bit set whose data with prepended header is large enough to fill a data unit greater than 90% of its capacity.

The controller may also find WS uncompressed writes within its non-transitory media.

To illustrate the operation of a protected logical drive, refer back to the 20 writes to a logical storage drive shown in FIG. 7. The logical storage drive was assumed to be a logical drive. For the next example, assume the logical storage drive is a protected logical drive with WS equal to 16 and RS equal to 1.

In some embodiments, once one of the three conditions above is satisfied, the controller forms a data unit from the write data, which satisfies the condition and then divides the data unit into WS equal sized data sub-units.

If the condition was satisfied by finding WS uncompressed writes within the controller's non-transitory media, an IULD entry for the data unit is created.

Figure 9:
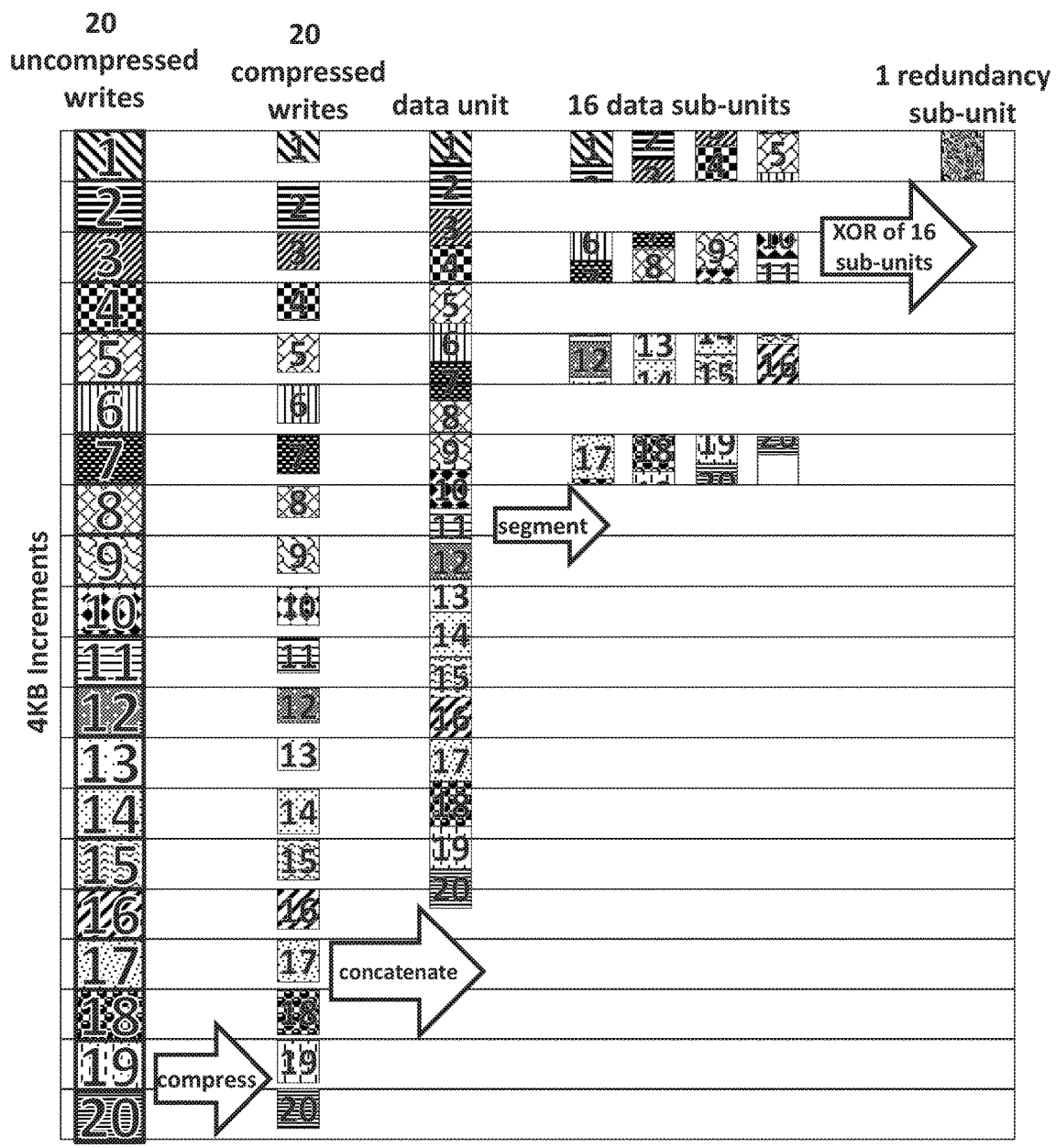
FIG. 9 shows exemplary writes forming a set of data sub-units and redundancy sub-unit within a protected logical storage drive.

Referring to FIG. 9, the arrow labeled "concatenate" illustrates how 20 compressed writes stored in NTM are combined to form a data unit. The arrow labeled "segment" illustrates the creation of WS equal sized data sub-units from the data unit.

The controller then uses a parity or coding scheme to compute RS redundancy sub-unit(s) for the unit using the WS unique data sub-units created by segmenting the data unit.

The arrow in FIG. 9 labeled "XOR of 16 sub-units" illustrates the redundancy sub-unit creation.

The controller selects a convenient free physical block location for storing the data unit from the set of physical blocks allocated to the protected logical drive when it was created. The controller then locates the region within the logical block address segment tracking structure and extracts the associated list of TS PD(s), each with optional offset.

The first data sub-unit formed by segmenting the data unit into WS sub-units is written to the first PD on the list of TS PD(s) found above at a physical block address computed by adding the address of the selected convenient free physical block to the offset for the first PD determined, if present.

This is repeated for each data sub-unit formed by segmenting the data unit until WS total sub-units have been written. The second data sub-unit must be written to the second PD on the list extracted, calculating the address by the method described above, and so on for every data sub-unit.

Before writing the final data sub-unit, the controller adds statistics to the last few bytes of the sub-unit showing: total number of writes within the data unit, average size of these writes, and the standard deviation of the sizes.

The controller then writes the first redundancy sub-unit to the next PD on the list, calculating the address as shown above. If the parity or coding scheme used generated more than one redundancy sub-unit, this process is repeated until RS redundancy sub-units have been written.

Figure 10:
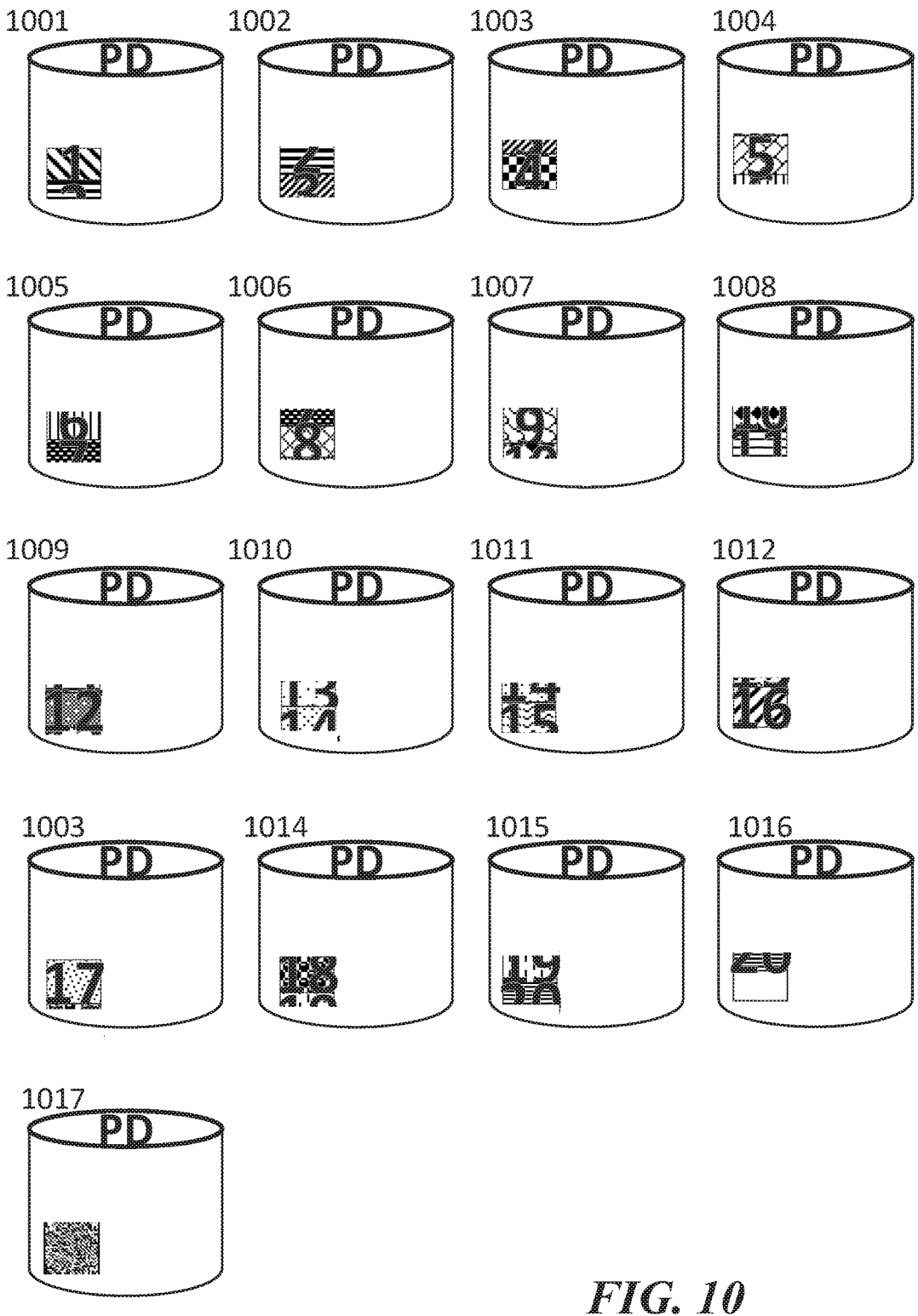
FIG. 10 shows exemplary units from FIG. 9 as written to physical storage drives.

FIG. 10 shows the sub-units generated and written to PDs. This is again very different from the logical storage drive view the controller has created for the computing system as shown on the logical storage drive 702 of FIG. 7, but is also very different from what happens with a normal logical drive as shown on the physical storage drive 802 of FIG. 8.

The controller then creates a LMT entry for the logical block of each write that is contained in the data unit. The LMT entry for a protected logical drive contains: physical block address, index within the unit, compression status, and the additional bit.

Once TS sub-units have been written to the physical drives and the LMT entry for each logical block contained within the data unit has been written, the SB entries for the logical blocks are deleted and the NTM occupied by the write data is freed.

A given embodiment may perform the steps shown in FIG. 9 in any order, except for the XOR step, which must be performed last.

Our exemplary embodiment orders the steps: compress, concatenate, segment, then XOR. However, other embodiments could reorder the first three steps in any order, including but not limited to: segment, compress, concatenate, and XOR.

When a computing system requests a read from a protected logical drive, a SB check is made to determine if the requested logical block is currently stored in NTM.

If the requested logical block is stored in NTM and is in compressed form, it is decompressed and returned to the computing system. If the logical block is stored in NTM and is in uncompressed from, it is returned to the computing system directly from the NTM.

If the requested logical block is not stored in NTM, its LMT entry is read to determine the physical block address to which the data unit containing the requested logical block was previously written, the index with the data unit field, and if it is in compressed form.

The controller examines the logical block address segment tracking structure, locates the region containing the requested address, and extracts the ordered list of PDs and optional offsets for the region.

If the requested logical block was stored in uncompressed form, the controller has enough information to map the requested logical block to a single data sub-unit, which is then read from the correct PD as determined from the tracking structure.

If this PD read fails, all of the remaining data sub-units and the redundancy sub-unit(s) are read from the PD and the failed data sub-unit is reconstructed.

The requested LBA contained in the read or reconstructed data sub-unit is returned to the computing system.

If the LMT entry indicates that the requested logical block was stored in compressed format, the controller reads one data sub-unit from each PD(s) determined at an address within each PD calculated by adding the physical address to the per PD offset until TS data sub-units have been retrieved from the PD(s) into volatile memory.

If any of the TS data sub-unit reads from the PD(s) fail, the redundancy sub-units are read and used to reconstruct the failed data sub-units.

The read or reconstructed data sub-units are concatenated in the same order the PDs are listed in the segment address tracking structure to recreate the unsegmented data unit.

The headers within the data units are traversed using the length field of each header until the header containing the requested logical block address is found. The data is decompressed and then returned to the computing system.

The data unit may be discarded or optionally retained if the controller predicts that additional reads from the data unit are likely.

When rewrites occur within a protected logical drive, the controller follows the process described above for rewrites within a normal logical drive.

The space reclamation process for data units within a protected logical drive is also identical to the process used for a normal logical drive.

Example 12—Write Process of Protected Logical Drives

The process for receiving new logical block writes from the computing system to a protected logical drive is identical to the process for a normal logical drive as described above and as shown in FIG. 3B. The process for writing the data to the PD(s) is different.

FIG. 11 shows an exemplary data write flowchart for protected logical drives. Operation 1101 examines logical block(s) in its scoreboard.

The operation 1102 further determines if 64 (or another number in other embodiments) compressed writes without the additional bit set or a group of compressed writes without the additional bit set whose data with prepended headers is large enough to fill a data unit to greater than 90% (or another percentage in other embodiments) of its capacity are contained in the score board and are thus ready to be written to the PDs.

Operation 1126 performs the same scoreboard check for compressed writes with the additional bit set and 1130 checks the scoreboard for WS uncompressed writes.

Once the condition in 1102, 1126, or 1130 are satisfied, the controller concatenates the selected logical blocks to form a data unit and writes statistics to the data unit, shown in 1103. The controller further segments the data unit on 4K boundaries to form WS data sub-units, shown in 1104. The next operation 1105 generates redundancy sub-units from the WS data sub-units, followed by the operation 1106 that writes all of the sub-units to physical storage drives.

If condition 1130 passed, an IULD entry for the data unit is created.

A check 1107 is performed by the controller to determine if any logical block has prior version LMT information in its SB entry. If no, the operation 1116 updates LMT entry for each logical block; otherwise, the following steps are executed.

If prior logical block(s) were compressed (step 1108), a check 1109 examines if there is an entry for the prior data units listed in Partial Unit List (PUL). If no such entry exists, the operation 1110 creates the corresponding PUL entries and marks the logical block(s) in the PUL entries as invalid using the index from the prior LMT entry, followed by updating the LMT entry for each logical block in step 1116. If the check 1109 finds an entry for the prior data units listed in the Partial Unit List (PUL), the operation 1111 marks the logical block(s) in the PUL entries as invalid using the index from the prior LMT entry. The check 1112 examines if there are 16 invalid entries in the PUL; if yes, operation 1113 reads the data unit to retrieve its statistics and updates the PUL entry with the statistics, followed by a check 1114 examining SR criteria; otherwise, the check 1114 is performed directly. When the SR criteria are met in the check 1114, the operation 1115 schedules the prior data unit(s) for space reclamation, followed by updating LMT entry for each logical block (step 1116); otherwise, the controller immediately updates the LMT entry for each logical block (step 1116).

If prior logical block(s) were uncompressed (step 1120), operation 1121 marks the logical block (s) in the Incompressible Unit Logical Block Descriptor (IULD) entries as invalid for data unit(s) using the index from the prior LMT entry. A check 1122 further examines the SR criteria. When the SR criteria are met in the check 1122, the operation 1123 schedules the prior data unit(s) for space reclamation, followed by updating the LMT entry for each logical block (step 1116); otherwise, the controller immediately updates LMT entry for each logical block (step 1116).

Finally, operation 1124 deletes SB entries and releases the NTM.

Example 13—Read Process of Protected Logical Drives

FIG. 12 shows an exemplary data read flowchart for protected logical drives. When the controller receives a read request (step 1201), a check 1202 examines if the corresponding logical block is in the scoreboard. If yes, the operation 1211 reads data from the NTM, followed by the check 1212 examining if the logical block is compressed; if the logical block is not compressed, the controller returns data (step 1240). If the logical block is compressed in the check 1212, the operation 1213 removes the header and decompresses data and the controller returns data (step 1240).

If the check 1202 determines that the corresponding logical block is not in the score board, the controller reads LMT entry for the logical block (step 1221) to determine if the requested logical block was stored in compressed form (check 1250). If the logical block is in compressed from, the controller reads WS sub-units from physical storage drives (step 1222). A check 1223 examines if all reads are complete. When the reads are incomplete, the controller further reads redundancy sub-units from the physical storage drives (step 1224) and generates missing data sub-units using redundancy sub-units (step 1225), followed by concatenating the WS data sub-units to form a data unit (step 1231). However, if the check 1223 determines that the data read is complete, the controller immediately concatenates the WS data sub-units to form a data unit (step 1231). Following the concatenation 1231 is that the controller traverses the data headers until the header containing the requested logical block address is found in step 1232. Next, a decompression algorithm 1234 is applied before returning data (step 1240) to the computing system. If the check in 1250 found the logical block was not stored in compressed form, the controller reads the physical block for the data sub-unit which contains the requested logical block (step 1252). Check 1254 verifies that this read is complete. When the read is incomplete, the controller further reads the remaining data sub-units and the redundancy sub-units (step 1256), reconstructs the failed data sub-unit (step 1258), and returns the data to the computing system (step 1240). However, if check 1254 determines the read completed, the controller can immediately return the data to the computing system (step 1240).

Example 14—Encryption and Data Privacy

Every write may optionally be encrypted using a key known only to the controller. This makes the data on each PD opaque once the PD has been removed from the domain of the controller and allows the PD to be discarded, rather than having to be destroyed.

The entire domain of a controller can be rendered opaque if the controller itself is removed (or optionally destroyed), allowing datacenter operators to securely decommission entire racks of PDs simply by removing all controller instances from the rack.

Example 15—Use Cases

Through the write compression, the controller creates spare, unused capacity, which may be used in multiple ways either singly or in combination with one another.

The first use of this spare capacity is to remap regions of a physical drive that either have failed or are predicted to fail.

If a region of a PD containing units belong to a logical drive fails without warning, the controller must fail the logical drive to the computing system as the data contained within the failed region of the PD is not recoverable. While not optimal, this is acceptable as all datacenter operators have a redundancy strategy in place to deal with failures.

However, rather than requiring that the PD be physically replaced and waiting days or weeks for that to occur, the controller can redefine the logical drive affected by the failure.

The new logical drive definition would include the physical blocks from the previous definition of the logical drive which were unaffected by failure, but would substitute physical blocks located in spare, unused capacity created through compression for the physical blocks affected by the failure.

The controller then presents the logical drive back to the computing system, which sees it as a new logical storage drive that it can begin using immediately. The spare capacity created through compression enables an outcome equivalent to a PD replacement that occurs in seconds without human intervention, requiring no spare parts, and without a requirement to destroy any failed equipment.

If a PD predicts that it will experience a full or partial failure in the future, the controller can more actively manage the situation.

The controller first interacts with the PD to determine what physical blocks within the PD will be affected by the predicted failure and then determines which logical drives are currently utilizing those physical blocks.

The controller then maps an equivalent number of physical blocks from spare, unused capacity created through compression into the logical drive(s).

The data units stored on the physical blocks that will be affected by the predicted future failure are then migrated to the newly added physical blocks through a process similar to the space reclamation procedures.

Once the migration is complete, the physical blocks likely to be affected by the predicted failure are removed from the logical drive(s).

The second use of spare, unused capacity created through compression is to expand the size of a logical drive so that the computing system can utilize the spare capacity created through compression.

In this use, the controller tells the computing system that the logical drive is actually larger than the sum of the physical blocks within the PD(s) which has been allocated to the logical drive.

The percent increase of the logical drive size over the sum of the physical blocks is determined by the past and/or expected future entropy of the writes to the logical drive.

The third use of spare, unused capacity created through compression is for redundancy so that even unpredicted failures will not force the controller to fail a logical drive to the computing system due to unrecoverable data.

The redundancy sub-units created for a protected logical drive can be stored in the spare, unused capacity that the controller creates through compression so that the computing system administrator is not required to provision explicit spare capacity to enjoy the benefits of redundancy.

A protected logical drive with redundancy has several additional benefits over the use of a traditional solution for redundancy such as RAID.

The controller is always able to write new data without needing to read back previous writes in order to correctly calculate parity or coding information. This elimination of RMW transactions improves the performance of writes.

If a PD predicts that physical blocks being used for a protected logical drive are likely to fail, the controller can migrate the data units stored on the physical blocks predicted to fail to other alternative physical blocks created through compression as described above for a normal logical drive.

If a PD has an unpredicted failure of physical blocks being used by a protected logical drive, the controller can perform a partial rebuild and remap of just the data units affected by the physical block failure(s).

The controller first determines which physical block(s) are affected by the PD failure and maps in an equivalent amount of additional physical blocks created through compression to the protected logical drive.

Every data unit stored on physical block(s) affected by the PD failure is relocated to the new physical blocks added to the protected logical drive through a process similar to the space reclamation procedures.

After failure, the affected physical block(s) will not be able to return their sub-units, so the redundancy sub-units will be required to reconstruct the write data before it can be resubmitted to the SB to form new data units and written to physical blocks on the PDs unaffected by failure.

This process rebuilds and remaps only the portion of the protected logical drive impacted by the fractional failure within the PDs, which will take less time to complete than rebuilding the entire protected logical drive, as is done by most existing solutions today.

Since writes are arbitrarily aggregated into units, the controller can read and aggregate them differently at any time. This allows the controller to group writes that are often read together into a single unit. The controller can also take a group of sequentially numbered logical blocks that were written at random times by the computing system and are thus in many different units and aggregate them again into new units in sequential logical block order.

Compression operations can use greater resources and time to generate a smaller compressed result or less resources and time to generate a larger compressed result.

Any data previously written by the controller may be read, compressed using greater resources and thus reduced in size, and then re-written, yielding additional free and unused space on the physical drives.

The controller can also manage the complexity of certain storage drives and make their behavior transparent to the computing system.

For a SMR hard drive, the controller can set the data unit size to be variable and equal to the size of the various SMR bands within the drive, with each data unit starting at the beginning physical block of the associated SMR band.

Since the controller only ever writes complete data units, the SMR hard drive would never receive anything except full SMR band writes, which perform well, despite the fact the computing system was still performing random writes, which would ordinarily perform badly if not for the capability of the controller.

There are many ways for the controller to compress and/or encrypt write data and to perform the inverse operations for read data. The same is true for segmentation and redundancy segment creation of write data and reassembly and/or recovery from redundancy segments for read data within a protected logical drive.

A novel option is to have a specialized hardware element that acts as a storage drive, but in fact only takes data written to it, modifies the data according to predetermined rules, and then allows the modified version of the data to be read.

A range of logical blocks within the specialized storage drive would imply only compression. Any data written to a specific logical block within that range of logical block addresses by the controller would be compressed and an appropriate header prepended. When the controller later read that specific logical block, the compressed write with prepended header would be returned by the specialized storage drive.

Another range of logical blocks within the storage drive would imply the inverse operation in which the controller writes compressed data with a prepended header to a specific logical block and is returned the uncompressed write data when it later reads that specific logical block.

Additional logical block ranges could add encryption after compression and others could imply decryption before decompression.

The specialized storage drives could even have a logical block range which would accept a write data from the controller and then compress, encrypt, segment M ways, and calculate N redundancy segments. Upon a later read from the controller, the specialized storage drive would return a structure containing the M+N segments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A device for improving data storage reliability and efficiency, the device comprising at least one processor:
  a) creating at least one logical storage drive comprising a plurality of logical blocks;
  b) mapping the at least one logical storage drive into at least one physical storage drive based on many-to-one mapping or one-to-many mapping, wherein the at least one physical storage drive comprises a plurality of physical blocks;
  c) applying a compression algorithm to data held in one or more logical blocks, aggregating units of the data, and storing the units of the data into one or more physical blocks;
  d) receiving a request from a computing system to write the data, wherein the computing system provides an associated logical block address of the data;
  e) copying the data from the one or more logical blocks to one or more non-transitory media and tracks an associated logical block address, wherein the one or more non-transitory media comprise one or more of: a non-volatile memory, a solid state drive, spin transfer torque memory, phase change memory, resistive RAM, and the at least one physical storage drive; and
  f) detecting first data writes to be rewritten in the future more frequently than second data writes, wherein i) the first data writes are segregated and only form data units with other similar writes and ii) the detecting first data writes comprises examining: the logical block address within the at least one logical storage drive, or an entropy level resulted from the applying the compression algorithm, or both.

2. A device for improving data storage reliability and efficiency, the device comprising at least one processor:
  a) creating at least one logical storage drive comprising a plurality of logical blocks;
  b) mapping the at least one logical storage drive into at least one physical storage drive based on many-to-one mapping or one-to-many mapping, wherein the at least one physical storage drive comprises a plurality of physical blocks;
  c) applying a compression algorithm to data held in one or more logical blocks, aggregating units of the data, and storing the units of the data into one or more physical blocks;
    wherein i) the at least one logical storage drive comprises at least one protected logical storage drive receiving a request from a computing system to read requested data from the at least one protected logical storage drive and ii) the computing system provides associated logical block addresses of one or more logical blocks of the requested data;
    wherein the reading the requested data comprises reading data sub-units of the requested data and concatenating the data sub-units to form a data unit; and wherein the reading the requested data further comprises reading redundancy sub-units of the requested data from the at least one physical storage drive and generating missing data sub-units of the requested data using the redundancy sub-units.

3. A device for improving data storage reliability and efficiency, the device comprising at least one processor:
   a) creating at least one logical storage drive comprising a plurality of logical blocks;
   b) mapping the at least one logical storage drive into at least one physical storage drive based on many-to-one mapping or one-to-many mapping, wherein the at least one physical storage drive comprises a plurality of physical blocks;
   c) applying a compression algorithm to data held in one or more logical blocks, aggregating units of the data, and storing the units of the data into one or more physical blocks;
      wherein i) the at least one logical storage drive comprises at least one protected logical storage drive receiving a request from a computing system to read requested data from the at least one protected logical storage drive and ii) the computing system provides associated logical block addresses of one or more logical blocks of the requested data;
      wherein the reading the requested data comprises determining if the requested data is a compressed form; and
      wherein the reading the requested data further comprises, when the requested data is in the compressed form, traversing headers of a data unit to identify logical block addresses, decompressing the requested data, and returning the requested data to the computing system.

4. A device for improving data storage reliability and efficiency, the device comprising at least one processor:
   a) creating at least one logical storage drive comprising a plurality of logical blocks;
   b) mapping the at least one logical storage drive into at least one physical storage drive based on many-to-one mapping or one-to-many mapping, wherein the at least one physical storage drive comprises a plurality of physical blocks;
   c) applying a compression algorithm to data held in one or more logical blocks, aggregating units of the data, and storing the units of the data into one or more physical blocks;
   d) creating a spare and unused storage capacity through compressing data in the at least one physical storage drive; and
   e) using the spare and unused storage capacity to expand a logical capacity of the at least one logical storage drive, wherein the logical capacity viewed by a computing system is larger than a physical capacity of mapped physical blocks and wherein the logical capacity is derived by past entropy or expected future entropy of writes to the at least one logical storage drive.

5. The device of claim 4, wherein the at least one processor further claims a free storage space by a) evaluating valid logical blocks mapped into the one or more physical blocks and b) copying and remapping the valid logical blocks from the one or more physical blocks to new physical blocks.

6. The device of claim 5, wherein the claiming the free storage space further comprises copying and remapping a first set of valid logical blocks from a first set of physical blocks and a second set of valid logical blocks from a second set of physical blocks into a third set of physical blocks without transferring stored data into and out of the at least one physical storage drive.

7. The device of claim 4, wherein a) the at least one logical storage drive comprises at least one protected logical storage drive receiving a request from a computing system to write data to the at least one protected logical storage drive, b) the computing system provides associated logical block addresses of one or more logical blocks of the data, and c) the writing data comprises:
   i) concatenating the one or more logical blocks of the data to form a data unit;
   ii) segmenting the data unit to form data sub-units;
   iii) performing error-correction coding on the data sub-units to generate redundancy sub-units; and
   iv) writing the data sub-units and the redundancy sub-units into the at least one physical storage drive.

8. The device of claim 7, wherein the writing data further comprises creating redundancy information for new write data without a need to read back previous writes.

9. The device of claim 4, wherein the at least one processor further uses the spare and unused storage capacity to remap a failed physical block of the at least one physical storage drive, wherein the failed physical block occurs without a warning and the remapping comprises:
   i) failing a first logical drive mapped into the failed physical block to a computing system;
   ii) creating a new mapping for a second logical drive wherein the second logical drive replaces the first logical drive, the new mapping excludes the failed physical block and replaces the failed physical block with a second physical block located in the spare and unused storage capacity; and
   iii) presenting the second logical drive to the computing system.

10. The device of claim 4, wherein the at least one processor further uses the spare and unused storage capacity to remap a predicted-to-be-failed physical block of the at least one physical storage drive, wherein the predicted-to-be-failed physical block occurs with a notified warning of a future failure and the remapping comprises:
   i) mapping a set of logical blocks into a second physical block, wherein the set of logical blocks is previously mapped into the predicted-to-be-failed physical block and the second physical block is in the spare and unused storage capacity;
   ii) migrating data from the predicted-to-be-failed physical block into the second physical block; and
   iii) upon completion of the migrating, dissociating the predicted-to-be-failed physical block from the set of logical blocks.

11. The device of claim 4, wherein the at least one processor further uses the spare and unused storage capacity to store redundancy information.

* * * * *